United States Patent

Su et al.

(10) Patent No.: US 11,962,760 B2
(45) Date of Patent: Apr. 16, 2024

(54) TENSOR-PRODUCT B-SPLINE PREDICTOR

(71) Applicant: DOLBY LABORATORIES LICENSING CORPORATION, San Francisco, CA (US)

(72) Inventors: Guan-Ming Su, Fremont, CA (US); Harshad Kadu, Santa Clara, CA (US); Qing Song, Sunnyvale, CA (US); Neeraj J. Gadgil, Pune (IN)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 17/764,394

(22) PCT Filed: Sep. 29, 2020

(86) PCT No.: PCT/US2020/053172
§ 371 (c)(1),
(2) Date: Mar. 28, 2022

(87) PCT Pub. No.: WO2021/067204
PCT Pub. Date: Apr. 8, 2021

(65) Prior Publication Data
US 2022/0408081 A1    Dec. 22, 2022

Related U.S. Application Data

(60) Provisional application No. 62/908,770, filed on Oct. 1, 2019.

(30) Foreign Application Priority Data

Oct. 1, 2019  (EP) ..................................... 19200793

(51) Int. Cl.
*H04N 19/105*     (2014.01)
*H04N 19/132*     (2014.01)
(Continued)

(52) U.S. Cl.
CPC ......... *H04N 19/105* (2014.11); *H04N 19/132* (2014.11); *H04N 19/154* (2014.11); *H04N 19/196* (2014.11); *H04N 19/436* (2014.11)

(58) Field of Classification Search
CPC .. H04N 19/103; H04N 19/105; H04N 19/132; H04N 19/154; H04N 19/186;
(Continued)

(56) References Cited

U.S. PATENT DOCUMENTS 7,272,265 B2    9/2007  Kouri
7,346,736 B1    3/2008  Gluhovsky
(Continued)

FOREIGN PATENT DOCUMENTS

EP    2801192 B1    9/2018
EP    3324622 B1    9/2019
(Continued)

OTHER PUBLICATIONS

Morozov O V et al: 11 Tensor B-spline reconstruction of multidimensional signals from large irregularly sampled data, Physics and Engineering of Microwaves, Millimeter and Submillimeter Waves (MSMW), 2010 International Kharkov Symposium on, IEEE, Piscataway, NJ, USA, Jun. 21, 2010 (Jun. 21, 2010), pp. 1-3.*
(Continued)

*Primary Examiner* — Mohammed S Rahaman

(57) ABSTRACT

A set of tensor-product B-Spline (TPB) basis functions is determined. A set of selected TPB prediction parameters to be used with the set of TPB basis functions for generating predicted image data in mapped images from source image data in source images of a source color grade is generated. The set of selected TPB prediction parameters is generated by minimizing differences between the predicted image data in the mapped images and reference image data in reference images of a reference color grade. The reference images
(Continued)

correspond to the source images and depict same visual content as depicted by the source images. The set of selected TPB prediction parameters is encoded in a video signal as a part of image metadata along with the source image data in the source images. The mapped images are caused to be reconstructed and rendered with a recipient device of the video signal.

20 Claims, 10 Drawing Sheets

(51) Int. Cl.
*H04N 19/154* (2014.01)
*H04N 19/196* (2014.01)
*H04N 19/436* (2014.01)

(58) Field of Classification Search
CPC .. H04N 19/196; H04N 19/436; H04N 19/463; H04N 19/50
See application file for complete search history.

(56) References Cited

U.S. PATENT DOCUMENTS

| | | | |
|---|---|---|---|
| 8,548,230 B2 | 10/2013 | Kameyama | |
| 8,605,995 B2 | 12/2013 | Kameyama | |
| 8,787,659 B2 | 7/2014 | Paris | |
| 8,874,477 B2 | 10/2014 | Hoffberg | |
| 9,386,313 B2 | 7/2016 | Su et al. | |
| 10,136,162 B2 | 11/2018 | Qu et al. | |
| 10,192,353 B1 | 1/2019 | Chou | |
| 2004/0189633 A1 | 9/2004 | Sederberg | |
| 2005/0168460 A1 | 8/2005 | Razdan | |
| 2006/0013505 A1 | 1/2006 | Yau | |
| 2007/0201061 A1 | 8/2007 | Miller | |
| 2013/0148029 A1 | 6/2013 | Gish | |
| 2014/0029675 A1* | 1/2014 | Su | G06F 17/18 375/240.16 |
| 2014/0327822 A1* | 11/2014 | Gish | H04N 19/85 348/453 |
| 2014/0341305 A1* | 11/2014 | Qu | H04L 69/22 375/240.26 |
| 2015/0124875 A1 | 5/2015 | Lidong | |
| 2015/0320316 A1 | 11/2015 | Dhawan | |
| 2017/0310968 A1 | 10/2017 | Rossato | |
| 2018/0020224 A1 | 1/2018 | Su | |
| 2018/0096229 A1 | 4/2018 | Bronstein | |
| 2018/0197322 A1 | 7/2018 | Sagar | |
| 2018/0204366 A1 | 7/2018 | Herman | |
| 2019/0044682 A1 | 2/2019 | Yoav | |
| 2019/0075569 A1 | 3/2019 | Zhang | |
| 2021/0050022 A1 | 2/2021 | Kjoerling | |
| 2022/0058783 A1 | 2/2022 | Kadu | |

FOREIGN PATENT DOCUMENTS

| | | |
|---|---|---|
| JP | 2009524371 | 6/2009 |
| JP | 2014520414 A | 8/2014 |
| JP | 2015503873 A | 2/2015 |
| WO | 20120122426 W | 9/2012 |
| WO | 2013103522 A1 | 7/2013 |

OTHER PUBLICATIONS

Eilers, P.H., Marx, B.D. "Splines, Knots, and Penalties" Wiley Interdisciplinary Reviews: Computational Statistics, 2(6), pp. 637-653 (pp. 1-26).*

J. Verhaeghe, Y. D'Asseler, S. Staelens, S. Vandenberghe and I. Lemahieu, "Reconstruction for Gated Dynamic Cardiac PET Imaging Using a Tensor Product Spline Basis," in IEEE Transactions on Nuclear Science, vol. 54, No. 1, pp. 80-91, Feb. 2007.*

Chung, Chin Wah Tony. "An Approach to Human Surface Modelling Using Cardinal Splines" PhD diss., Theses (School of Computing Science)/Simon Fraser University, Google Scholar. (THESIS).

E. Sakhaee, A. Entezari. "A Statistical Direct Volume Rendering Framework for Visualization of Uncertain Data" IEEE Transactions on Visualization and Computer Graphics, vol. 23, No. 12, pp. 2509-2520.

Fahrmeir, L. et al "Regression: Models, Methods and Applications", Springer, 2013.

ITU-R BT. 2100 "Image Parameter Values for High Dynamic Range Television for Use in Production and International Programme Exchange" ITU, Jun. 2017.

ITU-R Recommendation ITU-R BT.1886 "Reference Electro-Optical Transfer Function for Flat Panel Displays Used in HDTV Studio Production" Mar. 2011, pp. 1-7.

SMPTE 2084:2014 "High Dynamic Range Electro-Optical Transfer Function of Mastering Reference Displays" Aug. 16, 2014.

Unser, Michael. "Splines: A Perfect Fit for Signal and Image Processing" IEEE Signal processing magazine (1999): 22-38.

Jain, Anil K. "Fundamental of Digital Image Processing" 1989, Chapter 5.

Joachim Wipper, "B-Splines and Tensor Product B-Spines" Universitat Stuttgart, Aug. 31, 2006.

Auyeung, Cheung; "Color gamut scalable video coding with piecewise linear predictions and shift-offset model"; Joint Collaborative Team on Video Coding (JCT-VC) of ITU-T SG 16 WP 3 and ISO/IEC JTC 1/SC 29/WG 11; 14th Meeting; Vienna, Austria; Jul. 29, 2013-Aug. 2, 2013.

* cited by examiner

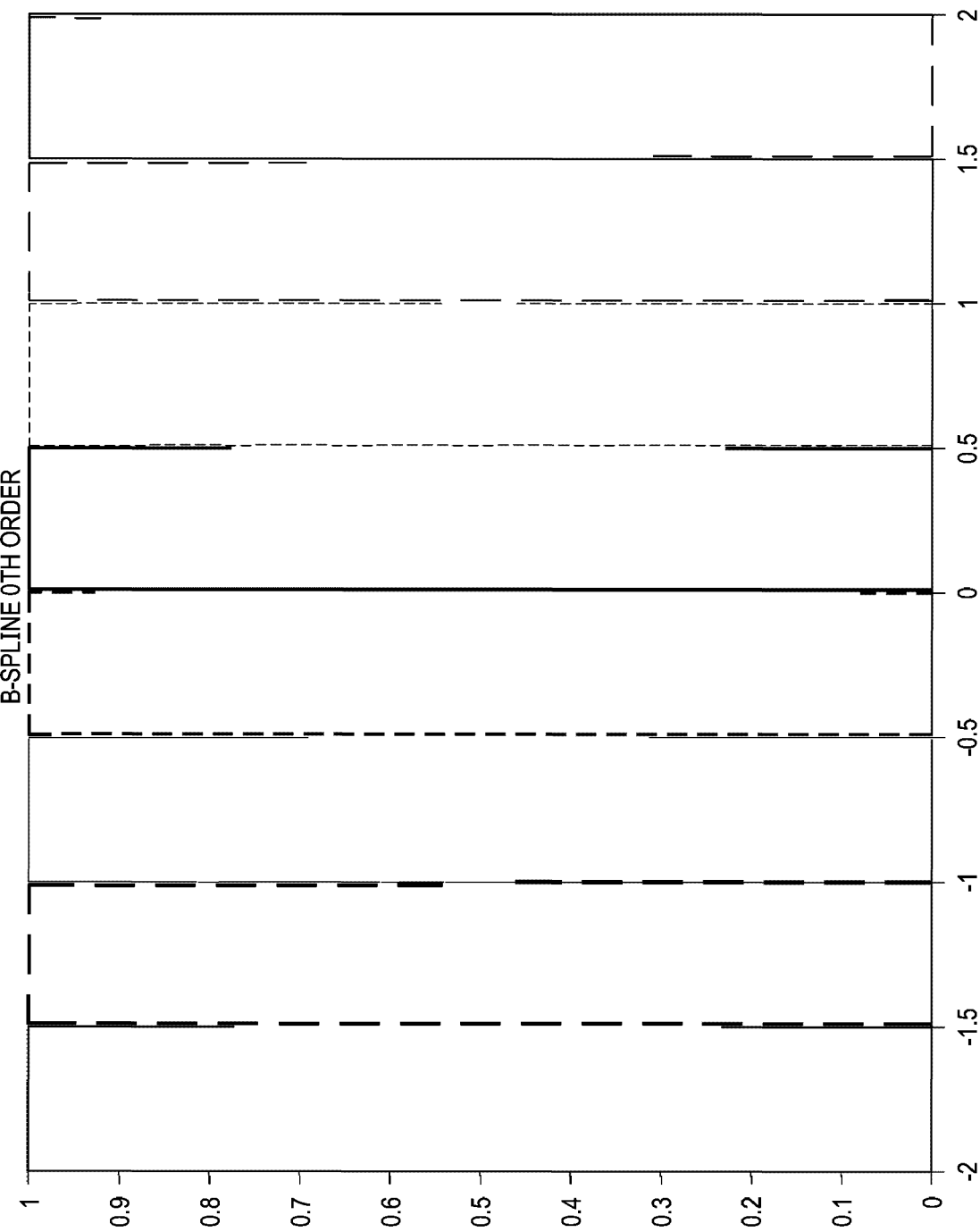

B-SPLINE 1ST ORDER

B-SPLINE 2ND ORDER

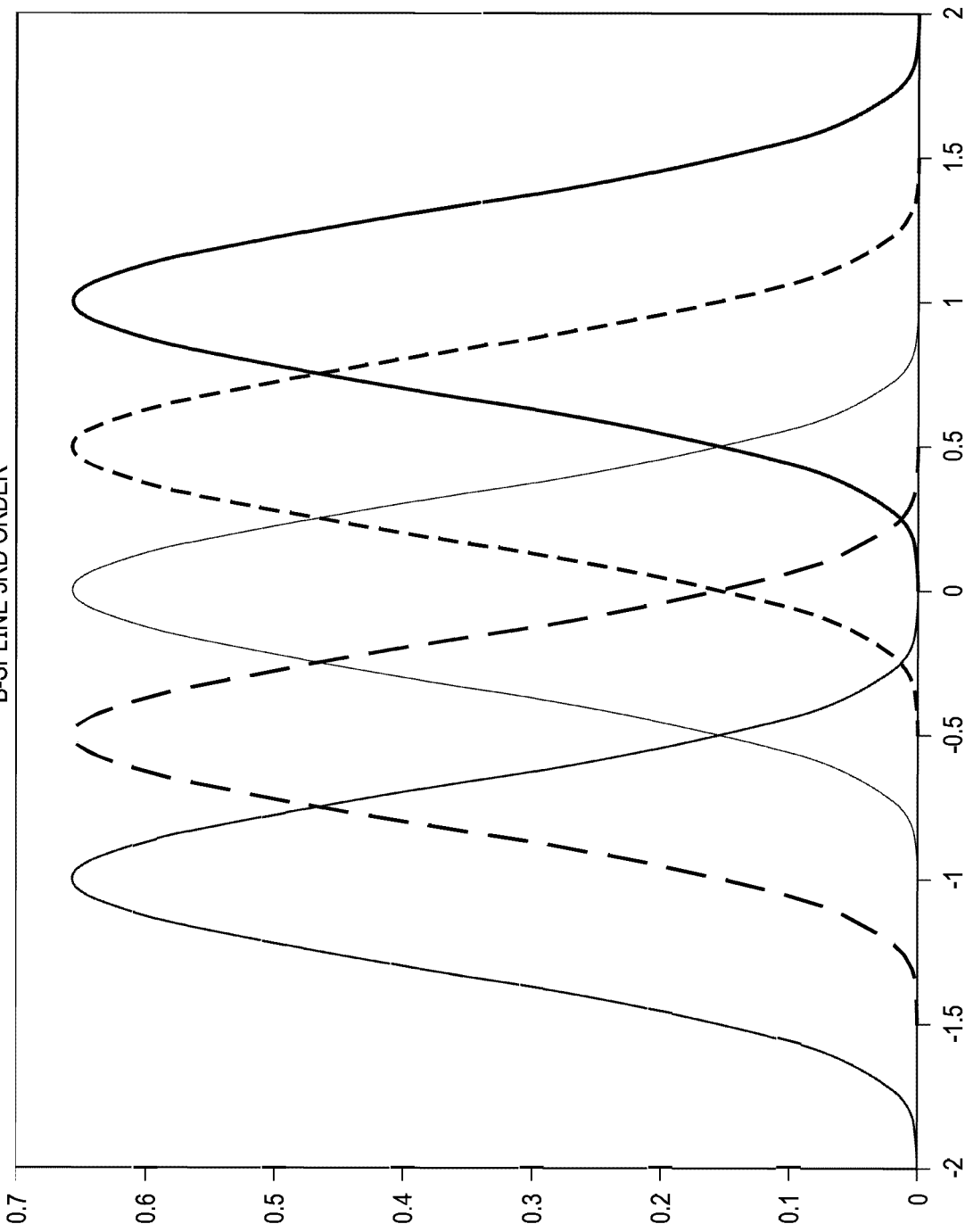

TENSOR-PRODUCT B-SPLINE PREDICTOR

CROSS REFERENCE TO RELATED APPLICATIONS

The application claims priority to U.S. Provisional Patent Application No. 62/908,770, filed Oct. 1, 2019 and European Patent Application No. 19200793.8, filed Oct. 1, 2019, each of which is hereby incorporated by reference in its entirety.

TECHNOLOGY

The present disclosure relates generally to images. More particularly, an embodiment of the present disclosure relates to tensor-product B-spline predictor.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE 2084 and Rec. ITU-R BT.2100, *"Image parameter values for high dynamic range television for use in production and international programme exchange,"* (06/2017). As appreciated by the inventors here, improved techniques for composing video content data that can be used to support display capabilities of a wide variety of SDR and HDR display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not by way of limitation, in the figures of the accompanying drawings and in which like reference numerals refer to similar elements and in which:

FIG. 3A through FIG. 3D illustrate example complete sets of B-Spline basis functions for uniformly distributed knots;

DESCRIPTION OF EXAMPLE EMBODIMENTS

Figure 1A:
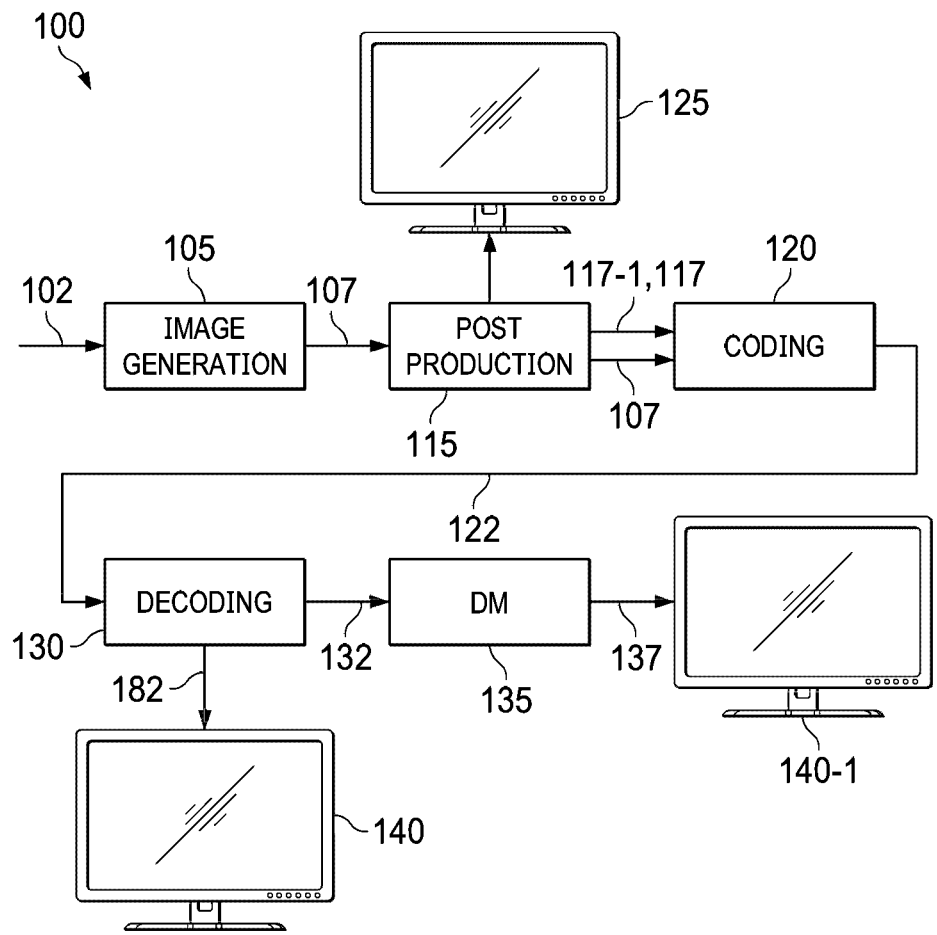
FIG. 1A depicts an example process of a video delivery pipeline.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

SUMMARY

Tensor-product B-spline (TPB) predictor is described herein. Techniques as described herein can be used to perform prediction operations in a video content processing pipelines and create composer metadata with an upstream video content processor to enable downstream video content processors to reconstruct video content of a first dynamic range (e.g., HDR, SDR, etc.) from decoded video content of a second different dynamic range (e.g., SDR, HDR, etc.) carried in a video signal. In some operational scenarios, composer metadata may be created with a single-channel luma predictor and a single-piece (e.g., applicable to some or all of possible input luminance and chrominance codewords, etc.) multiple-channel, multiple-regression (MMR) chroma predictor. The single-channel luma predictor may limit color saturation for pixels having the same luminance. The single-piece MMR limits local color prediction by imposing a global mapping. Those limitations may make reconstructed or mapped images less precision and more inaccuracy of colors and create relatively larger color difference for some portions (e.g., vibrant colors, highly saturated colors, etc.) of color charts (e.g., containing some or all possible colors to be represented or measured, etc.). Example single-channel luma prediction and MMR chroma prediction operations are described in U.S. Provisional Patent Application Ser. No. 62/781,185, filed on Dec. 18, 2018, the entire contents of which are hereby incorporated by reference as if fully set forth herein.

In some operational scenarios, TPB predictors as described herein may be used in a video content processing pipeline to generate composer metadata by an upper video content processor to enable downstream video content processors to reconstruct images with better picture quality and relatively high color precision.

A B-Spline possesses a property for approximating a given curve or a segment thereof using a polynomial with a continuity constraint of a specific order. B-Splines can be used in a regression process by simply performing data fitting on top of a B-Spline model. To capture a relatively high dimensionality of multiple input variables in video processing, a tensor-product B-Spline (or TPB) can be specified by multiplying multiple B-Spline functions together to achieve a relatively high dimension approximation of mappings, curves, etc., interrelating the multiple input variables to target values (or output variables). As compared with a combination of a single-channel luminance predictor and a single-piece MMR to generate composer metadata, using TPB to generate composer metadata provides a much better tool to model transformations between different color grades of possibly different dynamic ranges. Additionally, optionally or alternatively, TPB can be used to provide continuous curves by nature (with its inherent ability to ensure continuity up to a specific order), thereby avoiding or significantly reducing curve fitting operations after initial generation of predictions, transformations and/or mappings. For example, computationally intensive polynomial approximation algorithms to ensure continuity in multiple polynomial pieces as applied to the single-channel luminance predictor can be avoided under techniques as described herein.

TPB prediction may be used in different encoding scenarios, such as scene-based and linear-based cases. Three-dimensional mapping table (3DMT) techniques can be used in conjunction with TPB prediction to reduce visually perceptible color artifacts. Experimental results show prediction accuracy can be improved for 10~40× for luma and 1~4× for chroma.

Example embodiments described herein relate to generating and encoding TPB prediction parameters for image reconstruction. A set of tensor-product B-Spline (TPB) basis functions is determined. A set of selected TPB prediction parameters to be used with the set of TPB basis functions is generated for generating predicted image data in one or more mapped images from source image data in one or more source images of a source color grade. The set of selected TPB prediction parameters is generated by minimizing differences between the predicted image data in the one or more mapped images and reference image data in one or more reference images of a reference color grade. The one or more reference images correspond to the one or more source images and depict same visual content as depicted by the one or more source images. The set of selected TPB prediction parameters is encoded in a video signal as a part of image metadata along with the source image data in the one or more source images. The one or more mapped images are caused to be reconstructed and rendered with a recipient device of the video signal.

Example embodiments described herein relate to decoding TPB prediction parameters for image reconstruction and rendering. One or more first images of a first color grade are decoded from a video signal. Image metadata comprising a set of selected TPB prediction parameters for multiplying with a set of tensor-product B-Spline (TPB) basis functions is decoded from the video signal. The set of selected TPB prediction parameters was generated by an upstream video content processor. The set of selected TPB prediction parameters is to be used with the set of TPB basis functions for generating predicted image data in one or more mapped images from first image data in one or more first images of a first color grade. The upstream video content processor generated the set of selected TPB prediction parameters by minimizing differences between the predicted image data in the one or more mapped images and reference image data in one or more reference images of a reference color grade. The one or more reference images correspond to the one or more first images and depict same visual content as depicted by the one or more first images. The set of TPB prediction parameters is used with the set of TPB basis functions to generate the one or more mapped images from the one or more first images. One or more display images derived from the one or more mapped images are caused to be rendered with a display device.

Example Video Delivery Processing Pipeline

FIG. 1A depicts an example process of a video delivery pipeline (100) showing various stages from video capture/generation to an HDR or SDR display. Example HDR displays may include, but are not limited to, image displays operating in conjunction with TVs, mobile devices, home theaters, etc. Example SDR displays may include, but are not limited to, SDR TVs, mobile devices, home theater displays, headmounted display devices, wearable display devices, etc.

Video frames (102) are captured or generated using image generation block (105). Video frames (102) may be digitally captured (e.g. by a digital camera) or generated by a computer (e.g. using computer animation, etc.) to provide video data (107). Additionally, optionally or alternatively, video frames (102) may be captured on film by a film camera. The film is converted to a digital format to provide the video data (107). In some embodiments, the video data (107) may be (e.g., automatically with no human input, manually, automatically with human input, etc.) edited or transformed into a sequence of images before being passed to the next processing stage/phase in the video delivery pipeline (100).

The video data (107) is then provided to a processor for post-production editing (115). The post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, manual and/or automatic scene cut information generation, image cropping, addition of computer-generated visual special effects, etc.) may be performed at the post-production editing (115) to yield a release version of HDR images (117-1) or SDR (or relatively narrow dynamic range) images (117) (e.g., SDR, etc.).

In some embodiments, during post-production editing (115), the HDR images (117-1) are viewed on a reference HDR display that supports the high dynamic range by a colorist who is performing post-production editing operations on the HDR images (117-1).

In some other embodiments, during post-production editing (115), the SDR images (117) are viewed on a reference display (125) that supports the standard dynamic range (or a relatively narrow dynamic range) by a colorist who is performing post-production editing operations on the SDR images (117).

Figure 2A:
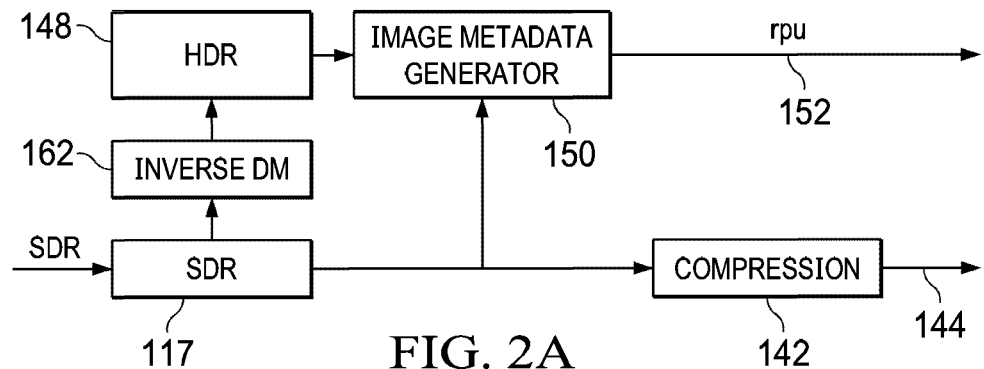
FIG. 2A through FIG. 2C illustrate example codec frameworks.
Figure 2B:
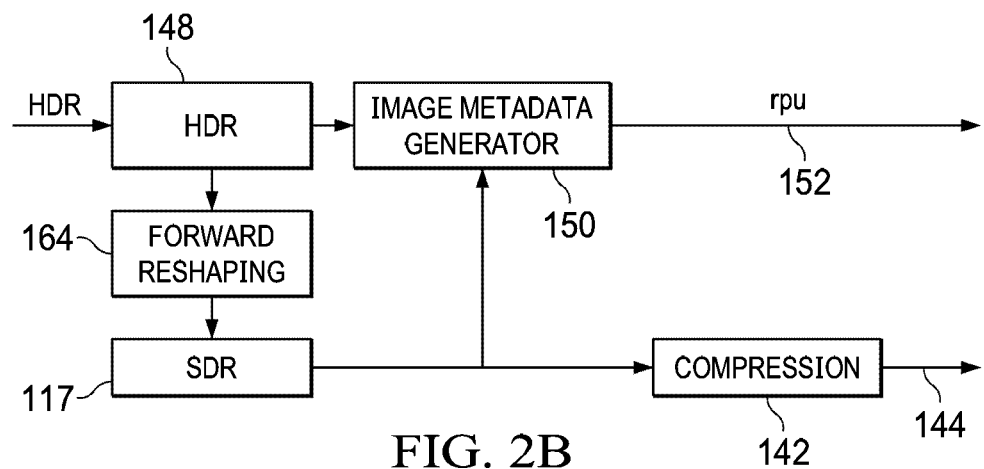

In some embodiments, the coding block (120) may implement a codec framework such as illustrated in FIG. 2A or FIG. 2B. In operational scenarios in which the coding block (120) receives the HDR images (117-1) from the post-production editing (115), the HDR images (117-1) may be forward reshaped by the coding block (120) into SDR images (e.g., 117).

The SDR images (117) are compressed by the coding block (120) into a coded bitstream (122), for example in a single layer. In some embodiments, the coding block (120) may include audio and video encoders, such as those defined by ATSC, DVB, DVD, Blu-Ray, and other delivery formats, to generate the coded bitstream (122).

In some embodiments, the coded bitstream (122) is encoded with the SDR images (117) that preserve the artistic intent with which the SDR images (117) are generated in the post-production editing (115). Additionally, optionally or alternatively, in some embodiments, the coded bitstream (122) is encoded with the SDR images (117) that preserve the artistic intent with which the HDR images (117-1)—which are forward reshaped into the SDR images (117)—are generated in the post-production editing (115).

The coding block (120) may encode the SDR images (117) into video data in a video signal (e.g., an 8-bit SDR video signal, a 10-bit SDR video signal, etc.) that is backward compatible (or alternatively non-backward compatible) with a wide variety of SDR display devices (e.g., SDR displays, etc.). In a non-limiting example, the video signal encoded with the SDR images (117) may be a single-layer backward compatible (or alternatively non-backward compatible) video signal.

In some embodiments, the coded bitstream (122) is a video signal in compliance with the same video signal format as the input SDR YCbCr video signal received by the coding block (120). For example, in cases where the input SDR YCbCr video signal received by the coding block (120) is an 8-bit SDR YCbCr video signal, the coded bitstream (122) outputted by the coding block (120) may represent an output 8-bit SDR YCbCr video signal with the image metadata including but not limited to composer metadata as generated by the coding block (120) and/or the post-production block (115). The composer metadata (or backward reshaping mappings) can be used by downstream decoders to perform backward reshaping (e.g., inverse tone mapping, etc.) on the SDR images (117) in order to generate backward reshaped images that may be relatively accurate for rendering on (e.g., multiple target, etc.) HDR reference displays.

In some embodiments, the backward reshaped images may be generated from the SDR images (117) (or a decoded version thereof) using one or more SDR-to-HDR conversion tools implementing inverse tone mapping based at least in part on the composer metadata. A used herein, backward reshaping refers to image processing operations that convert re-quantized images back to the original EOTF domain (e.g., gamma or PQ) or a different EOTF domain, for further downstream processing, such as the display management. Additionally, optionally, or alternatively, reshaping as described herein (e.g., forward reshaping, backward reshaping, etc.) may refer to image processing operations that convert between different EOTFs, different color spaces, different dynamic ranges, and so forth.

The coded bit stream (122) is further encoded with image metadata including but not limited to display management (DM) metadata that can be used by the downstream decoders to perform display management operations on the backward reshaped images for the HDR reference displays to generate display images for rendering on (e.g., multiple, etc.) device-specific HDR displays.

The coded bitstream (122) is then delivered downstream to receivers such as decoding and playback devices, media source devices, media streaming client devices, television sets (e.g., smart TVs, etc.), set-top boxes, movie theaters, and the like. In a receiver (or a downstream device), the coded bitstream (122) is decoded by decoding block (130) to generate decoded images 182, which may be the same as the SDR images (117), subject to quantization errors generated in compression performed by the coding block (120) and decompression performed by the decoding block (130).

Example SDR video contents as represented by the SDR images (117) or its decoded version may, but are not necessarily limited to only, be SDR+ video contents, SDR images, SDR movie releases, SDR+ images, SDR media programs, etc. As used herein, the term "SDR+" denotes a combination of SDR image data and metadata, which when combined together allow generating corresponding high dynamic range (HDR) image data. SDR+ image metadata may include composer data to generate backward reshaping mappings (e.g., TPB backward reshaping mappings, etc.) which when applied to an input SDR image generate a corresponding HDR image. SDR+ images allow backwards compatibility with legacy SDR displays which can ignore the SDR+ image metadata and simply display the SDR image.

Image metadata transmitted with SDR video contents to a recipient device may include composer metadata generated (e.g., automatically, in real time, in offline processing, etc.) under techniques described herein. In some embodiments, the video data (107) is provided to a processor for composer metadata generation (115). The composer metadata generation (115) may automatically generate composer metadata with no or little human interaction. The automatically generated composer metadata can be used by recipient device(s) to perform backward reshaping operations for generating corresponding high dynamic range (HDR) images from SDR images in the video data (107).

The composer metadata generation (115) can be used to provide one or more valuable services for making video contents available to a wide variety of display devices. One of the valuable services provided by the composer metadata generation (115) is to generate the HDR images from the SDR images as mentioned above, in operational scenarios in which HDR images for video content depicted in the SDR images are not available but the SDR images depicting the video content are available. Thus, techniques as described herein can be used to generate or compose HDR video content for HDR displays, in these operational scenarios in which the SDR images are available.

Another valuable service provided by the composer metadata generation (115) is to generate HDR video content for HDR displays (e.g., entirely, partially, etc.) without relying on some or all of a colorist's manual operations known as "color timing" or "color grading."

Additionally, optionally, or alternatively, the DM metadata in the image metadata can be used by the downstream decoders to perform display management operations on the backward reshaped images to generate display images (e.g., HDR display images, etc.) for rendering on the HDR reference display devices, or other display devices such as non-reference HDR display devices, etc.

In operational scenarios in which the receiver operates with (or is attached to) an SDR display 140 that supports the standard dynamic range or a relatively narrow dynamic range, the receiver can render the decoded SDR images directly or indirectly on the target display (140).

In operational scenarios in which the receiver operates with (or is attached to) an HDR display 140-1 that supports a high dynamic range (e.g., 400 nits, 1000 nits, 4000 nits, 10000 nits or more, etc.), the receiver can extract the composer metadata (e.g., TPB composer metadata, etc.) from (e.g., the metadata container in, etc.) the coded bitstream (122) and use the composer metadata to compose HDR images (132), which may be backward reshaped images generated from backward reshaping the SDR images based on the composer metadata. In addition, the receiver can extract the DM metadata from the coded bitstream (122) and apply DM operations (135) on the HDR images (132) based on the DM metadata to generate display images (137) for rendering on the HDR (e.g., non-reference, etc.) display device (140-1) and render the display images (137) on the HDR display device (140-1).

Codec Frameworks

In some operational scenarios, SDR+ can be used to enhance SDR content for rendering on HDR display devices. Luma and chroma channels (or color space components) of SDR images may be mapped separately using image metadata such as composer metadata to generate corresponding luma and chroma channels of (mapped) HDR images.

It should be noted, however, that in various embodiments techniques as described herein may be used for single layer inverse display management (SLiDM) or non-SLiDM codec frameworks. For example, TPB metadata generation, transmission and consumption as described herein may be used in conjunction with a multi-layer video signal that comprises two or more coding layers comprising SDR or HDR content.

Additionally, optionally or alternatively, TPB metadata generation, transmission and consumption as described herein may be used in conjunction with a non-SDR (or non-SDR+) video signal such as an HDR signal. For example, instead of including TPB backward reshaping metadata to be used by recipient devices to backward reshape decoded SDR content to generate reconstructed HDR content, the HDR signal may include TPB forward reshaping metadata to be used by recipient devices to forward reshape decoded HDR content to generate reconstructed SDR content.

Thus, while techniques as described herein may be described with example codec frameworks or video signals for illustration purposes only, these techniques are not limited to example codec frameworks or video signals and may be implemented with other codec frameworks or video signals.

Figure 2C:
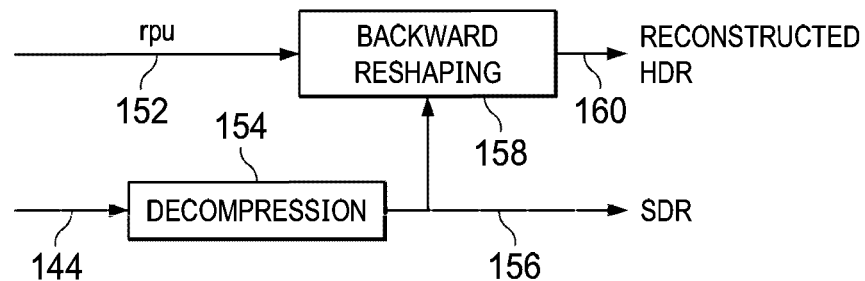
Figure 3B:
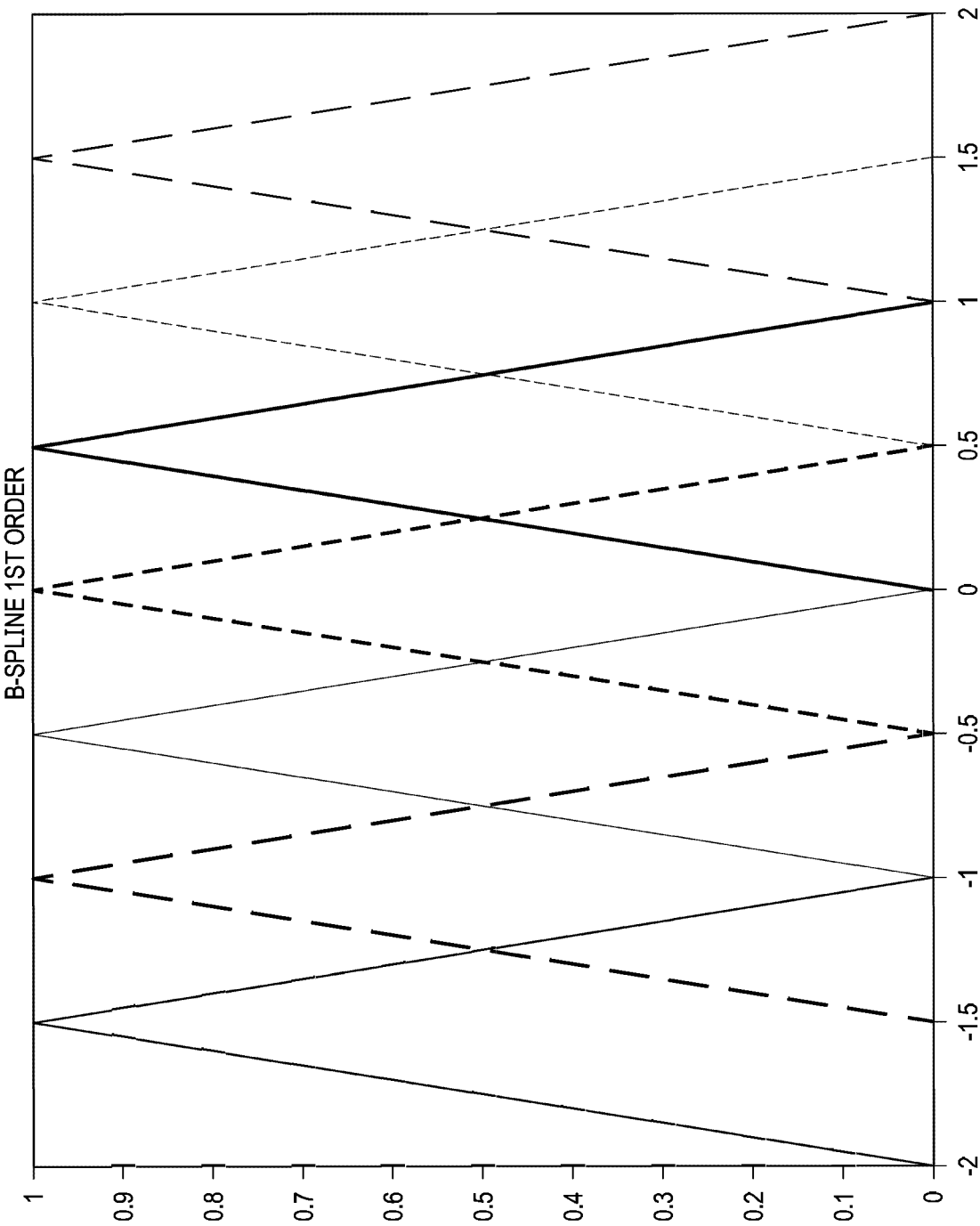
Figure 3C:
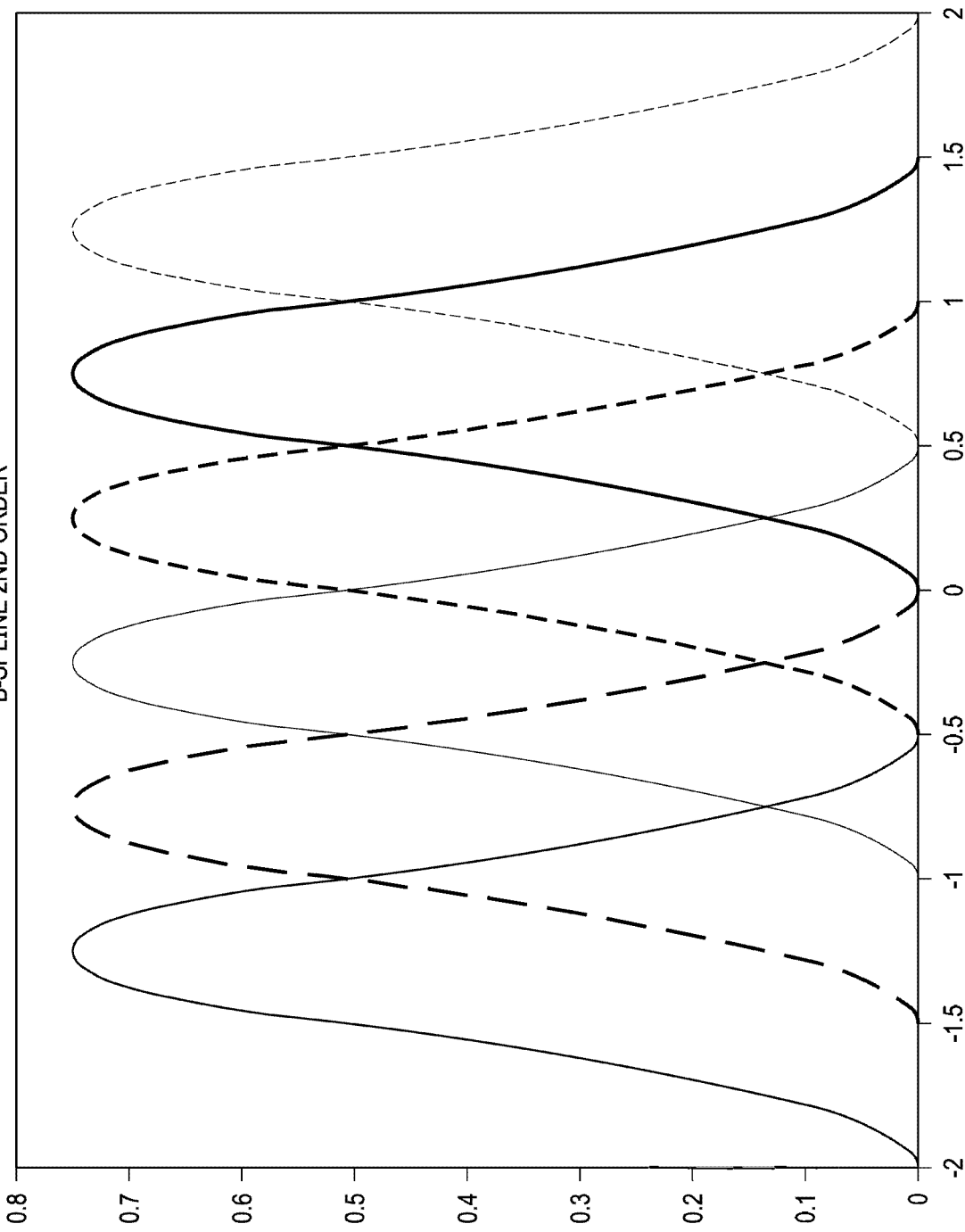

FIG. 2A through FIG. 2C illustrate example codec frameworks. More specifically, FIG. 2A illustrates an example of a first encoder-side codec architecture, which may be implemented with one or more computing processors in an upstream video encoder, etc. FIG. 2B illustrates an example of a second encoder-side codec architecture, which may be implemented with one or more computing processors in an upstream video encoder, etc. FIG. 2C illustrates an example of a decoder-side codec architecture, which may also be implemented with one or more computing processors in a downstream video decoder (e.g., a receiver, etc.), etc.

In the first framework, as illustrated in FIG. 2A, backward compatible SDR images such as the SDR images (117), etc., are received as input on the encoder side of the codec framework.

By way of illustration but not limitation, an inverse dynamic-range mapping (DM) module 162—which may represent an SDR-to-HDR conversion tool, etc.—is used to convert the SDR images (117) to HDR images 148 for viewing on reference HDR displays. In some embodiments, the inverse-DM module may also be referred to as an inverse tone-mapping tool.

In the second framework as illustrated in FIG. 2B, the HDR images (148) for reference HDR displays, etc., are received as input on the encoder side of the codec framework. Here, "HDR images for reference HDR displays" may refer to HDR images that are specifically color graded for HDR (reference) displays.

By way of illustration but not limitation, a forward reshaping module 164—which may represent an HDR-to-SDR conversion tool, etc.—is used to convert the HDR images (148) to the SDR images (117) for viewing on SDR displays. In some embodiments, the forward reshaping module may also be referred to as a tone-mapping tool.

In both the first and second encoder-side codec architectures, an image metadata generator 150 (e.g., a part of the coding block (120), etc.) receives both of the SDR images (117) and the HDR images (148) as input, generates image metadata 152 such as TPB composer metadata, DM metadata, and so forth. Backward reshaped images (132) for an HDR (e.g., reference, target, etc.) display can be generated by backward reshaping the SDR images (117) with backward reshaping functions/curves as specified in the TPB composer metadata.

In some embodiments, the backward reshaped images (132) represent production-quality or near-production-quality HDR images for the HDR display. The backward reshaped images (132) may be outputted in an output HDR video signal 160 (e.g., over an HDMI interface, over a video link, etc.) to and rendered on the HDR display device. In these embodiments, the receiver can retrieve the TPB composer metadata and to reconstruct and render HDR images reconstructed by backward reshaping the SDR images (117) based on the TPB composer metadata.

In both the first and second encoder-side architecture, a compression block 142 (e.g., a part of the coding block (120) of FIG. 1A, etc.) compresses/encodes the SDR images (117) in a single layer 144 of a video signal. An example video signal may be, but is not necessarily limited to only, the coded bitstream (122) of FIG. 1A. The image metadata (152) (denoted as "rpu"), as generated by the image metadata generator (150), may be encoded (e.g., by the coding block (120) of FIG. 1A, etc.) into the video signal (e.g., a coded bitstream, etc.).

In both the first and second encoder-side architectures, the image metadata (152) may be separately carried in the video signal from the single layer in which the SDR images are encoded in the video signal. For example, the image metadata (152) may be encoded in a component stream in the coded bitstream, which component stream may or may not be separate from the single layer (of the coded bitstream) in which the SDR images (117) are encoded.

In both the first and second encoder-side architectures, the TPB composer metadata in the image metadata (152) in the video signal can be used to enable downstream receivers to backward reshape the SDR images (117) (which are encoded in the video signal) into reconstructed images (or backward reshaped images) for HDR target displays. Example HDR target displays may include, but are not necessarily limited to only, any of: an HDR target display with similar display capabilities to those of the HDR reference display, an HDR target display with different display capabilities from those of the HDR reference display, an HDR target display with additional DM operations to map reconstructed video content for the HDR reference display to display video content for the HDR target display, etc.

In some operational scenarios, in both the first and second encoder-side architectures, SDR content is encoded and transmitted, in a single layer of a video signal such as the code bit stream (122), etc., by an upstream encoding device that implements the encoder-side codec architecture. The SDR content is received and decoded, in the single layer of the video signal, by a downstream decoding device (or a receiver) that implements the decoder-side codec architecture. TPB composer metadata is also encoded and transmitted in the video signal with the SDR content so that recipient devices can reconstruct HDR content based on the SDR content and the TPB composer metadata.

In some embodiments, as illustrated in FIG. 2C, the video signal encoded with the SDR images (117) in the single layer (144) and the TPB backward reshaping metadata (152) as a part of the overall image metadata are received as input on the decoder side of the first and second encoder-side architectures.

A decompression block 154 (e.g., a part of the decoding block (130) of FIG. 1A, etc.) decompresses/decodes compressed video data in the single layer (144) of the video signal into the decoded SDR images (182). The decoded SDR images (182) may be the same as the SDR images (117) subject to quantization errors in the compression block (142) and in the decompression block (154). The decoded SDR images (182) may be outputted in an output SDR video signal 156 (e.g., over an HDMI interface, over a video link, etc.) to and rendered on an SDR display device.

In addition, a backward reshaping block 158 extracts the image metadata (152) such as the TPB composer metadata (or backward reshaping metadata) from the input video signal, constructs the backward reshaping functions based on the extracted TPB composer metadata in the image metadata, and performs backward reshaping operations on the decoded SDR images (117) based on the backward reshaping functions to generate the backward reshaped images (132) (or reconstructed HDR images) for the specific HDR target display.

In some embodiments, the backward reshaped images (132) represent production-quality or near-production-quality HDR images for the HDR reference display. The backward reshaped images (132) may be outputted in an output HDR video signal 160 (e.g., over an HDMI interface, over a video link, etc.) to and rendered on an HDR display with display capabilities similar to those of the HDR reference display. Thus, in these embodiments, DM functionality may not be implemented by a receiver to simplify device operations and reduce device costs.

Additionally, optionally or alternatively, in some embodiments, DM metadata may be transmitted with the TPB composer metadata and the SDR images (117) to the receiver. Display management operations specific to an HDR target display with different display capabilities from those of the HDR reference display may be performed on the backward reshaped images (132) based at least in part on the DM metadata in the image metadata (152), for example to generate display HDR images to be rendered on the HDR target display.

B-Spline Based Prediction

TPB (based) prediction may be used to derive selected operational parameters of mappings or transformations between or among different color grades depicting the same visual semantic content. As used herein, a color grade may refer to a (e.g., release, a professionally color graded, color graded by a user or video professional, reconstructed, to-be-predicted, etc.) version of video images.

A mapping or transformation between two color grades depicting the same visual semantic content may refer to a forward reshaping mapping or transformation, a backward reshaping mapping or transformation, and so forth. Example reshaping operations are described in U.S. Provisional Patent Application Ser. No. 62/136,402, filed on Mar. 20, 2015, (also published on Jan. 18, 2018, as U.S. Patent Application Publication Ser. No. 2018/0020224); U.S. Provisional Patent Application Ser. No. 62/670,086, filed on May 11, 2018, the entire contents of which are hereby incorporated by reference as if fully set forth herein.

In some operational scenarios, forward reshaping refers to generating video images of the same or lower dynamic range from video images (depicting the same visual semantic content) of a higher dynamic range.

In some operational scenarios, forward reshaping refers to generating to-be-encoded video images (e.g., in an out video signal delivered from an upstream video content processor to downstream video content processor(s), etc.) of a dynamic range from input or source video images (depicting the same visual semantic content) of the same or a different dynamic range.

In some operational scenarios, backward reshaping refers to generating video images of a higher dynamic range from video images (depicting the same visual semantic content) of a relatively low dynamic range.

In some operational scenarios, backward reshaping refers to generating video images of a dynamic range from received video images (depicting the same visual semantic content)—e.g., encoded in a received video signal delivered from an upstream video content processor to downstream video content processor(s), etc.—of the same or a different dynamic range.

TPB prediction techniques as described herein can be used to generate image metadata or composer metadata representing forward reshaping mappings/transformation and/or backward reshaping mappings/transformations. B-Spline based prediction may be performed for a single variable (e.g., a single color channel of a color space, a single color component of a color space, one channel among R, G, B channels, one channel among Y, Cb, Cr channels, etc.), as well as multiple variables (e.g., two or more color channels of a color space, two or more color components of a color space, two or more channels among R, G, B channels, two or more channels among Y, Cb, Cr channels, etc.) by way of tensor-product B-Spline. In some operational scenarios, the TPB prediction may be implemented in a prediction process of SDR to HDR or HDR to SDR.

TABLE 1 below illustrates example polynomial splines.

TABLE 1

A polynomial spline of degree or order n can be constructed with knots $a = k_0 < \ldots < k_{T-1} = b$ as a real-valued function f(z), over a range of [a, b], that satisfies the following conditions:
f(z) is (n−1) times continuously differentiable when integer n = 1 or more. No smoothness requirements exists for f(z) when n = 0.
f(z) is a n-th order polynomial over an interval formed by two adjacent knots $[k_t, k_{t+1})$.

B-Spline basis functions can be constructed from piecewise polynomials that are fused smoothly at the knots (e.g., break points connecting adjacent piecewise polynomials, etc.) to achieve desired smoothness or continuity constraints. A B-Spline basis function consists of (n+1) polynomial pieces of degree (or order) n, which are joined with knots up to and including the (n−1) order of continuity or differentiability. Using a complete set of B-Spline bases (or basis functions), a given function $f(z)$ (e.g., mapping, curve, etc.) can be represented through a linear combination of D=T+n−1 B-Spline basis functions (T represents the number of knots) in the complete set, as follows:

$$f(z) = \sum_{t=0}^{D-1} m_t B_t(z) \qquad (1)$$

Note that a B-Spline basis function is only positive or supported on an interval based on two adjacent knots among the (e.g., T, n+2, etc.) knots.

The 0-th (zero-th) order of a B-Spline basis function may be specified as follows:

$$B_t^0(z) = I(k_t \leq z < k_{t+1}) = \begin{cases} 1 & k_t \leq z \leq k_{t+1} \\ 0 & \text{otherwise} \end{cases} t = 0, \ldots, D-2 \qquad (2)$$

A higher order (n-th order) of a B-Spline basis function may be recursively specified as follows:

$$B_t^n(z) = \frac{z - k_{t-1}}{k_t - k_{t-1}} B_{t-1}^{n-1}(z) + \frac{k_{t+1} - z}{k_{t+1} - k_{t+1-n}} B_t^{n-1}(z) \qquad (3)$$

Exterior knots such as 2n outer knots may be placed outside [a, b]—which is a range in which interior knots are distributed—in addition to interior knots $k_0, \ldots, k_{T-1}$.

FIG. 3A through FIG. 3D illustrate four example complete sets of 0-th (zero-th) through 3rd order B-Spline basis functions for a set of uniformly distributed knots (or knot points). Additional complete sets of B-Spline basis functions of different orders may be recursively constructed using expression (3) above.

In operational scenarios in which the number of interior knots T=8 knots and a complete set of 2nd order B-Spline basis functions is used, the total number D of basis function in the set is 9. A corresponding set of 9 coefficients $\{m_t\}$ can be used to predict or approximate a one-dimensional (1D) mapping or curve, for example for single-channel prediction of a luminance channel of a color space used to represent video content.

For the purpose of illustration only, the complete set of 9 2nd order B-Spline basis functions is applied to predict or approximate 1D mapping or curve between HDR and SDR.

Suppose each of an SDR image (e.g., the j-th SDR image, etc.) and a corresponding HDR image (e.g., the j-th HDR image depicting the same visual semantic content as the SDR image but with a relatively high dynamic range, etc.) comprises P pixels. Let triplets $(s_{ji}^y, s_{ji}^{c0}, s_{ji}^{c1})$ and $(v_{ji}^y, v_{ji}^{c0}, v_{ji}^{c1})$ represent normalized Y, $C_0$ (e.g., Cb, etc.) and $C_1$ (e.g., Cr, etc.) values for the i-th pixel in the j-th SDR and HDR image respectively. A single channel B-Spline predictor may be used to predict $s_{ji}^y$ from $v_{ji}^y$ for the luma or luminance channel.

A set of specific knots or knot points may be selected and used to construct a complete set of $D^y(=T+n-1)$ B-Spline basis functions denoted as $B_{j,t}^y()$. Single-channel prediction $\hat{s}_{ji}^y$ of SDR luminance codeword values from HDR luminance codeword values $v_{ji}^y$ may be performed using a set of corresponding coefficients $\{m_{j,t}^y\}$, as follows:

$$\hat{s}_{ji}^y = f_j^y(v_{ji}^y) = \sum_{t=0}^{D^y-1} m_{j,t}^y B_{j,t}^y(v_{ji}^y) \qquad (4)$$

Given P pixels in each of the SDR and HDR images, all P to-be-predicted (or target) SDR luminance codeword values, the corresponding coefficients $(m_{j,t}^y)$, and the B-Spline basis functions $(B_{j,t}^y)$ can be collected into a matrix form for predicting the (target) SDR luminance codewords values ($\hat{s}_{ji}^y$) from the corresponding (input) HDR luminance codeword values ($v_{ji}^y$), as follows:

$$\hat{s}_j^y = S_j^y m_j^y \qquad (5)$$

where $$\hat{s}_j^y = \begin{bmatrix} \hat{s}_{j,0}^y \\ \hat{s}_{j,1}^y \\ \vdots \\ \hat{s}_{j,P-1}^y \end{bmatrix} \qquad (6)$$

$$m_j^y = \begin{bmatrix} m_{j,0}^y \\ m_{j,1}^y \\ \vdots \\ m_{j,D^y-1}^y \end{bmatrix} \qquad (7)$$

$$S_j^y = \begin{bmatrix} B_{j,0}^y(v_{j,0}^y) & B_{j,1}^y(v_{j,0}^y) & \cdots & B_{j,D^y-1}^y(v_{j,0}^y) \\ B_{j,0}^y(v_{j,1}^y) & B_{j,1}^y(v_{j,1}^y) & \cdots & B_{j,D^y-1}^y(v_{j,1}^y) \\ \vdots & \vdots & & \vdots \\ B_{j,0}^y(v_{j,P-1}^y) & B_{j,1}^y(v_{j,P-1}^y) & \cdots & B_{j,D^y-1}^y(v_{j,P-1}^y) \end{bmatrix} \qquad (8)$$

where the left-hand-side (LHS) in expression (8) denotes a design matrix.

Denote a ground truth vector comprising all P actual (e.g., target, reference, etc.) SDR codeword values as follows:

$$s_j^y = \begin{bmatrix} s_{j,0}^y \\ s_{j,1}^y \\ \vdots \\ s_{j,P-1}^y \end{bmatrix} \qquad (9)$$

A solution of coefficients $m_j^y$ can be obtained via a least squared solution in a closed form as follows:

$$m_j^{y,opt} = ((S_j^y)^T S_j^y)^{-1}((S_j^y)^T s_j^y) \qquad (10)$$

To solve this least squared problem, special care may be exercised, for example to take into account scenarios in which the B-Spline matrix $S_j^y$ is relatively sparse. In operational scenarios in which the knot points may be pre-selected or fixed regardless what kind of signal or pixel data distribution is, empty or no pixels may exist in knot intervals between adjacent knots. As a B-Spline basis function is only positive or supported over a relatively small interval and zero outside the interval, empty intervals in which no pixels may exist may contribute to some or all zero columns (each of which comprises all zeros) in $S_j^y$. Such zero columns may make computations of the matrix $(S_j^y)^T S_j^y$ ill-defined or to encounter singularity. In some operational scenarios, to solve or ameliorate this problem, for columns which have all zeros or all relatively small values (e.g., as compared with a numeric threshold set programmatically, empirically, or by user, etc.) in $S_j^y$, corresponding coefficients ($m_{j,t}^y$) may be set to zeros.

Denote each element in $S_j^y$ as $S_j^y(\alpha, \beta)$ and the α-th column as $S_j^y(\alpha,:)$. An example procedure to reconstruct the design matrix with exclusion of columns of all zero values or all relatively small values (e.g., the sum in the column below a numeric threshold, each matrix element in the column below a numeric threshold, etc.) is illustrated in TABLE 2 below.

TABLE 2

$\tilde{S}_j^y = 0_{P \times 0}$
$\Phi_j^y = \{ \}$
c = 0;
For each column, α, in $S_j^y$
  // sum up the value of each element in the $\alpha^{th}$ column $$U_\alpha = \sum_{\beta=0}^{P-1} S_j^y(\alpha, \beta)$$

// retain the column if the sum is bigger than a numeric threshold
  // add to new matrix
  If($U_\alpha > \delta$)
    $\tilde{S}_j^y = \lfloor \tilde{S}_j^y \; S_j^y(\alpha,:) \rfloor$
    $\Phi_j^y = \Phi_j^y \cup \alpha$
    c ++
  end
end In some operational scenarios, instead of using expression (10) above, the least squared problem may be solved using $\tilde{S}_j^y$, as obtained in TABLE 2 above, as follows:

$$\tilde{m}_j^{y,opt} = ((\tilde{S}_j^y)^T \tilde{S}_j^y)^{-1}((\tilde{S}_j^y)^T s_j^y) \qquad (11)$$

As the total number of columns $D^y$ has been reduced to c, where c represents a new total number of columns excluding ($D^y$−c) column(s) each of which comprises all zero or all relatively small numbers, the solution of expression (11) may lack coefficients or parameters corresponding to the excluded column(s). Using an example procedure as illustrated in TABLE 3 below, a parameter/coefficient vector comprising parameters/coefficients for all columns may be constructed by filling parameters/coefficients corresponding to the removed ($D^y$−c) columns with 0s (zeros), as follows:

$$m_j^{y,opt}(\Phi_j^y) = \tilde{m}_j^{y,opt} \qquad (12)$$

TABLE 3

For α = 0 : 1 : $D^y$ −1
  If( α is in $\Phi_j^y$ )
    Find corresponding index α' in $\Phi_j^y$ for a given α
    $m_j^{y,opt}(\alpha) = \tilde{m}_j^{y,opt}(\alpha')$
  else
    $m_j^{y,opt}(\alpha) = 0$
  end
end In some operational scenarios, locations of knots or knot points are pre-selected or fixed. It should be noted, however, that in various embodiments, locations (and/or the total number) of knots or knot points may or may not be pre-selected or fixed. For example, in some operational scenarios, as locations (and/or the total number) of knots or knot points may affect optimality of the solution, the locations (and/or the total number) of knots or knot points $\{k_t\}$, along with the parameters/coefficients $\{m_{j,t}^y\}$ may be adaptively determined as a part of an overall minimization (or optimization) problem or solution.

While adaptively selecting knot points can further improve performance and accuracy of mappings or transformations between or among different color grades of video content, presetting or pre-selecting uniformly distributed knot points brings out example advantages including but not limited to: (1) no need to signal or send by an upstream video content processor to a downstream video content processor knot locations of B-Spline basis functions in image metadata, which reduces bitstream overheads for carrying and encoding the image metadata, (2) no need to re-compute basis functions at the decoder side in response to different knot points which otherwise may be adaptively changed frame by frame, and so forth. In other words, B-Spline basis functions with knot points preset or fixed can be hard wired in logic or stored in data store at the decoder side to reduce runtime computation load and/or hardware complexity.

TPB Cross-Color Channel Predictor

In some operational scenarios, there may be relatively large limitations for generating mappings between HDR and SDR (vice versa) using a single-channel predictor such as a single-channel (or 1D) B-Spline predictor. The 1D B-Spline predictor may provide prediction performance and accuracy comparable with other approaches (e.g., cumulative-density-function or CDF based approaches, minimal-mean-squared-error or MMSE based approaches, etc.), with possibly additional computational complexity. The mapping problem for different color grades of video content lies in a multi-dimensional color space (e.g., 3D color space such as RGB, IPT, YDzDx, and YCbCr, three or more channels in a color space, etc.), which 1D function or prediction may suffer limitation in some operational scenarios. For example, relatively accurate mappings between HDR and SDR (back and forth) may involve cross-color operations (e.g., similar to those performed manually by color grading specialists, etc.), such as color transform and saturation control. Thus, using 1-D predictor to solve this mapping problem in multi-dimensional color space involving human perceptions of colors, hues and saturations at different luminance levels may not be optimal.

To improve prediction performance and accuracy, TPB prediction capable of exploring local and/or global cross-color channel relationships among different color grades of video content may be employed under techniques as described herein.

In contrast with some approaches in which cross-channel prediction represents a global mapping operator, TPB cross channel prediction can flexibly model a mapping in each local partition (e.g., applying a region-specific mapping to up to each of many local single- or multi-dimensional codeword regions instead of applying a global mapping to all codewords or colors, etc.) of a color space or a color gamut, outperforming the other approaches that do not implement techniques as described herein.

TPB cross-channel prediction may be applied to predict codewords in luminance or luma channel from HDR to SDR (or vice versa). In the previous example of the color space Y, C0 (or Cb) and C1 (or Cr), in each color channel or dimension, a complete set of B-Spline basis functions is independently provided. Thus, there are three sets of B-Spline basis functions $B_{j,t^y}^{y,0}(v_{ji}^y)$, $B_{j,t^{c0}}^{y,1}(v_{ji}^{c0})$ and $B_{j,t^{c1}}^{y,2}(v_{ji}^{c1})$ for Y, $C_0$ and $C_1$ color channels or dimensions, respectively. Here j denotes the j-th SDR and HDR images, $t^y$ denotes a B-Spline basis function index (given a set of knot points along the Y dimension) for the luma or luminance Y dimension; $t^{c0}$ denotes a B-Spline basis function index (given a set of knot points along the C0 dimension) for the chroma or chrominance C0 dimension; $t^{c1}$ denotes a B-Spline basis function index (given a set of knot points along the C1 dimension) for the chroma or chrominance C1 dimension; i denotes a pixel index among P pixels in each of the SDR and HDR images.

Denote the total numbers of B-Spline basis functions in these three complete sets of B-Spline basis functions $B_{j,t^y}^{y,0}(v_{ji}^y)$, $B_{j,t^{c0}}^{y,1}(v_{ji}^{c0})$ and $B_{j,t^{c1}}^{y,2}(v_{ji}^{c1})$ as $D_0^y$, $D_1^y$, and $D_2^y$, respectively. Given a respective set of knot points in each of the 3 dimensions, each set in the three complete sets of B-Spline basis functions $B_{j,t^y}^{y,0}(v_{ji}^y)$, $B_{j,t^{c0}}^{y,1}(v_{ji}^{c0})$ and $B_{j,t^{c1}}^{y,2}(v_{ji}^{c1})$ may be constructed using expression (3) above.

TPB basis functions for predicting codewords in the luminance and luma channel can be constructed by taking vector products of the three complete sets of B-Spline basis functions $B_{j,t^y}^{y,0}(v_{ji}^y)$, $B_{j,t^{c0}}^{y,1}(v_{ji}^{c0})$ and $B_{j,t^{c1}}^{y,2}(v_{ji}^{c1})$ for all three color channels or dimensions. A TPB basis function with a (3D) TPB index representing a unique combination of $t^y$, $t^{c0}$ and $t^{c1}$ may be given or computed as follows:

$$B_{j,t^y,t^{c0},t^{c1}}^{TPB,y}(v_{ji}^y,v_{ji}^{c0},v_{ji}^{c1})=B_{j,t^y}^{y,0}(v_{ji}^y)\cdot B_{j,t^{c0}}^{y,1}(v_{ji}^{c0})\cdot B_{j,t^{c1}}^{y,2}(v_{ji}^{c1}) \quad (13)$$

Cross-channel prediction $\hat{s}_{ji}^y$ of SDR luminance codeword values from HDR luminance and chrominance codeword values $v_{ji}^y$, $v_{ji}^{c0}$ and $v_{ji}^{c1}$ may be performed using a set of corresponding coefficients $\{m_{j,t}^{TPB,y}\}$, as follows:

$$\hat{s}_{ji}^y = f_j^{TPB,y}(v_{ji}^y, v_{ji}^{c0}, v_{ji}^{c1}) = \sum_{t^y=0}^{D_0^y-1}\sum_{t^{c0}=0}^{D_1^y-1}\sum_{t^{c1}=0}^{D_2^y-1} m_{j,t^y,t^{c0},t^{c1}}^{TPB,y}\cdot B_{j,t^y,t^{c0},t^{c1}}^{TPB,y}(v_{ji}^y, v_{ji}^{c0}, v_{ji}^{c1}) \quad (14)$$

The 3D TPB index ($t^y$, $t^{c0}$, and $t^{c1}$) may be vectorized into a 1D index (denoted as t) to simplify expressions here. The TPB basis function previously with the 3D TPB index ($t^y$, $t^{c0}$, and $t^{c1}$) may be rewritten as follows:

$$B_{j,t}^{TPB,y}(v_{ji}^y,v_{ji}^{c0},v_{ji}^{c1})=B_{j,t^y,t^{c0},t^{c1}}^{TPB,y}(v_{ji}^y,v_{ji}^{c0},v_{ji}^{c1}) \quad (15)$$

Let $D^y=D_0^y\cdot D_1^y\cdot D_2^y$. The TPB cross-channel prediction in expression (14) above can be rewritten as follows:

$$\hat{s}_{ji}^y = f_j^{TPB,y}(v_{ji}^y, v_{ji}^{c0}, v_{ji}^{c1}) = \sum_{t=0}^{D^y-1} m_{j,t}^{TPB,y}\cdot B_{j,t}^{TPB,y}(v_{ji}^y, v_{ji}^{c0}, v_{ji}^{c1}) \quad (16)$$

Given P pixels in each of the SDR and HDR images, all P to-be-predicted (or target) SDR luminance codeword values, the corresponding coefficients ($m_j^{TPB,y}$), and the cross-channel TPB functions ($B_{j,t}^{TPB,y}(v_{ji}^y, v_{ji}^{c0}, v_{ji}^{c1})^y$) can be collected into a matrix form for predicting the (target) SDR luminance codewords values ($\hat{s}_{ji}^y$) from the corresponding (input) HDR luminance and chrominance codeword values ($v_{ji}^y$, $v_{ji}^{c0}$, $v_{ji}^{c1})^y$) as follows:

$$\hat{s}_j^y = S_j^{TPB,y} m_j^{TPB,y} \quad (17)$$

where $$S_j^{TPB,y} = \begin{bmatrix} B_{j,0}^{TPB,y}(v_{j0}^y, v_{j0}^{c0}, v_{j0}^{c1}) & B_{j,1}^{TPB,y}(v_{j0}^y, v_{j0}^{c0}, v_{j0}^{c1}) & \cdots & B_{j,D^y-1}^{TPB,y}(v_{j0}^y, v_{j0}^{c0}, v_{j0}^{c1}) \\ B_{j,0}^{TPB,y}(v_{j1}^y, v_{j1}^{c0}, v_{j1}^{c1}) & B_{j,1}^{TPB,y}(v_{j1}^y, v_{j1}^{c0}, v_{j1}^{c1}) & \cdots & B_{j,D^y-1}^{TPB,y}(v_{j1}^y, v_{j1}^{c0}, v_{j1}^{c1}) \\ \vdots & \vdots & & \vdots \\ B_{j,0}^{TPB,y}(v_{j,P-1}^y, v_{j,P-1}^{c0}, v_{j,P-1}^{c1}) & B_{j,1}^{TPB,y}(v_{j,P-1}^y, v_{j,P-1}^{c0}, v_{j,P-1}^{c1}) & \cdots & B_{j,D^y-1}^{TPB,y}(v_{j,P-1-1}^y, v_{j,P-1}^{c0}, v_{j,P-1}^{c1}) \end{bmatrix} \quad (18)$$

$$m_j^{TPB,y} = \begin{bmatrix} m_{j,0}^{TPB,y} \\ m_{j,1}^{TPB,y} \\ \vdots \\ m_{j,D^y-1}^{TPB,y} \end{bmatrix}$$

where the LHS of expression (18) denotes a design matrix.

A solution of coefficients $m_j^{TPB,y}$ can be obtained via a least squared solution in a closed form as follows:

$$m_j^{TPB,y,(opt)} = ((S_j^{TPB,y})^T S_j^{TPB,y})^{-1}((S_j^{TPB,y})^T s_j^y) \qquad (20)$$

where $s_j^y$ denotes the ground truth vector in expression (9) above.

To facilitate discussion, expression (20) may be rewritten using the matrix and vector as follows:

$$B_j^y = (S_j^{TPB,y})^T S_j^{TPB,y} \qquad (21)$$

$$a_j^y = (S_j^{TPB,y})^T s_j^y \qquad (22)$$

Thus, $$m_j^{TPB,y,(opt)} = (B_j^y)^{-1} a_j^y \qquad (23)$$

Similarly, TPB cross-channel predictors may be built for two chroma channels or dimensions. By way of illustration, denote any of the chroma channels C0 and C1 as C. Given three sets of know points in Y, $C_0$ and $C_1$ dimensions, three complete sets of B-Spline basis functions $B_{j,t^{c,0}}(v_{ji}^y)$, $B_{j,t^{c,1}}(v_{ji}^{c0})$ and $B_{j,t^{c,2}}(v_{ji}^{c1})$ may be built for Y, $C_0$ and $C_1$ dimensions for TPB prediction of codewords in the chroma channel C (where C can be C0 or C1). The total numbers of the three complete sets of B-Spline basis functions may be $D_0^c$, $D_1^c$, and $D_2^c$, respectively. By given a set of knot points in 3 dimension, we have 3 individual basis function sets $B_{j,t^{c,0}}(v_{ji}^y)$, $B_{j,t^{c,1}}(v_{ji}^{c0})$ and $B_{j,t^{c,2}}(v_{ji}^{c1})$.

Similar to the TPB cross-channel prediction of codewords in the Y channel, for the chroma channel C, TPB cross-channel basis functions may be built with the indexed tensor elements as follows:

$$B_{j,t^{c,0},t^{c,1}}^{TPB,c}(v_{ji}^y, v_{ji}^{c0}, v_{ji}^{c1}) = B_{j,t^{c,0}}(v_{ji}^y) \cdot B_{j,t^{c,0},1}(v_{ji}^{c0}) \cdot B_{j,t^{c,1},2}(v_{ji}^{c1}) \qquad (24)$$

Similarly, the 3D TPB index ($t^y$, $t^{c0}$, and $t^{c1}$) can be vectorized into a 1D index (denoted as t) to simplify expressions here. Let $D^c = D_0^c \cdot D_1^c \cdot D_2^c$. The TPB cross-channel prediction for codewords in the chroma channel C may be given as follows:

$$\hat{s}_{ji}^c = f_j^{TPB,c}(v_{ji}^y, v_{ji}^{c0}, v_{ji}^{c1}) = \sum_{t=0}^{D^c-1} m_{j,t}^{TPB,c} \cdot B_{j,t}^{TPB,c}(v_{ji}^y, v_{ji}^{c0}, v_{ji}^{c1}) \qquad (25)$$

Given P pixels in each of the SDR and HDR images, all P to-be-predicted (or target) SDR chrominance codeword values, the corresponding coefficients ($m_j^{TPB,c}$), and the cross-channel TPB functions $(B_{j,t}^{TPB,c}(v_{ji}^y, v_{ji}^{c0}, v_{ji}^{c1})^c)$ can be collected into a matrix form for predicting the (target) SDR luminance codewords values ($\hat{s}_j^c$) from the corresponding (input) HDR luminance and chrominance codeword values ($v_{ji}^y$, $v_{ji}^{c0}$, $v_{ji}^{c1}$), as follows:

$$\hat{s}_j^c = S_j^{TPB,c} m_j^{TPB,c} \qquad (26)$$

where $$S_j^{TPB,c} = \begin{bmatrix} B_{j,0}^{TPB,c}(v_{j0}^y, v_{j0}^{c0}, v_{j0}^{c1}) & B_{j,1}^{TPB,c}(v_{j0}^y, v_{j0}^{c0}, v_{j0}^{c1}) & \cdots & B_{j,D^c-1}^{TPB,c}(v_{j0}^y, v_{j0}^{c0}, v_{j0}^{c1}) \\ B_{j,0}^{TPB,c}(v_{j1}^y, v_{j1}^{c0}, v_{j1}^{c1}) & B_{j,1}^{TPB,c}(v_{j1}^y, v_{j1}^{c0}, v_{j1}^{c1}) & \cdots & B_{j,D^c-1}^{TPB,c}(v_{j1}^y, v_{j1}^{c0}, v_{j1}^{c1}) \\ \vdots & \vdots & & \vdots \\ B_{j,0}^{TPB,c}(v_{j,P-1}^y, v_{j,P-1}^{c0}, v_{j,P-1}^{c1}) & B_{j,1}^{TPB,c}(v_{j,P-1}^y, v_{j,P-1}^{c0}, v_{j,P-1}^{c1}) & \cdots & B_{j,D^c-1}^{TPB,c}(v_{j,P-1}^y, v_{j,P-1}^{c0}, v_{j,P-1}^{c1}) \end{bmatrix} \qquad (27)$$

$$m_j^{TPB,c} = \begin{bmatrix} m_{j,0}^{TPB,c} \\ m_{j,1}^{TPB,c} \\ \vdots \\ m_{j,D^c-1}^{TPB,c} \end{bmatrix} \qquad (28)$$

where the LHS of expression (27) represents a TPB-based matrix.

A solution of coefficients $m_j^{TPB,c}$ can be obtained via a least squared solution in a closed form as follows:

$$m_j^{TPB,c,(opt)} = ((S_j^{TPB,c})^T S_j^{TPB,c})^{-1}((S_j^{TPB,c})^T s_j^c) \qquad (29)$$

To facilitate discussion, expression (29) may be rewritten using the matrix and vector as follows:

$$B_j^c = (S_j^{TPB,c})^T S_j^{TPB,c} \qquad (30)$$

$$a_j^c = (S_j^{TPB,c})^T s_j^c \qquad (31)$$

Thus, $$m_j^{TPB,c,(opt)} = (B_j^c)^{-1} a_j^c \qquad (32)$$

In some operational scenarios, locations of knots or knot points are pre-selected or fixed. It should be noted, however, that in various embodiments, locations (and/or the total number) of knots or knot points may or may not be pre-selected or fixed. For example, in some operational scenarios, as locations (and/or the total number) of knots or knot points may affect optimality of the solution, the locations (and/or the total number) of knots or knot points $\{k_t\}$, along with the parameters/coefficients $\{m_j^{TPB,c}\}$ may be adaptively determined as a part of an overall minimization (or optimization) problem or solution for TPB cross-channel prediction.

While adaptively selecting knot points can further improve performance and accuracy of mappings or transformations between or among different color grades of video content, presetting or pre-selecting uniformly distributed knot points used in multi-dimensional TPB tensor brings out example advantages including but not limited to: (1) no need to signal or send by an upstream video content processor to a downstream video content processor knot locations used in multi-dimensional TPB basis functions in image metadata, which reduces bitstream overheads for carrying and encoding the image metadata, (2) no need to re-compute B-Spline or TPB basis functions at the decoder side in response to different knot points which otherwise may be adaptively changed frame by frame, and so forth. In other words, TPB basis functions with knot points preset or fixed can be hard wired in logic or stored in data store at the decoder side to reduce runtime computation load and/or hardware complexity.

In operational scenarios in which all three channels or dimensions each have the same TPB basis functions, then the S matrixes for different channels are the same, as follows:

$$S_j^{TPB} = S_j^{TPB,y} = S_j^{TPB,c0} = S_j^{TPB,c1} \tag{33}$$

At the decoder side, on the same $S_j^{TPB}$ matrix is computed with no need to compute different S matrixes for different channels or dimensions. Then the cross-channel predicted codeword values for each channel can be obtained by multiplying the same S matrix with corresponding prediction parameter/coefficients, as follows:

$$\hat{s}_j^y = S_j^{TPB} m_j^{TPB,y} \tag{34-1}$$

$$\hat{s}_j^{c0} = S_j^{TPB} m_j^{TPB,c0} \tag{34-2}$$

$$\hat{s}_j^{c1} = S_j^{TPB} m_j^{TPB,c1} \tag{34-2}$$

In another example, the two chroma channels use the same S matrix, while a different S matrix is used for the luma channel. For example, the S matrix for the luma channel has greater dimensions than the S matrix for the chroma channel. In such a case the number of predictor coefficients for the luma channel will be greater than the number of predictor coefficients for each of the luma channels.

Efficient Decoder Architecture

When knots or knot points are uniformly distributed including exterior knot points, B-Spline basis functions can be expressed by a linear combination of truncated polynomials. A n-th order truncated polynomial may be defined as follows:

$$(x-a)_+^n = \begin{cases} (x-a)^n & x \geq a \\ 0 & x < a \end{cases} \tag{35}$$

Denote the knot points as $\{k_t^y\}$, $\{k_t^{c0}\}$ and $\{k_t^{c1}\}$ for channels Y, C0 and C1. When the knot points $\{k_t^y\}$, $\{k_t^{c0}\}$ and $\{k_t^{c1}\}$ are uniformly distributed, the distance between every two consecutive (or adjacent) knot points can be expressed as $h^y$, $h^{c0}$, and $h^{c1}$, respectively. For simplicity, the knot points for each channel may be denoted as $\{k_t\}$ and h, respectively.

The first order of the $t^{th}$ B-Spline basis function can be constructed with a linear combination of truncated polynomials as follows:

$$B_t^1(x) = \left(\frac{1}{h}\right)[(x-k_{t-1})_+ - 2(x-k_t)_+ + (x-k_{t+1})_+] \tag{36}$$

where $B_t^1(x)$ is only positive or supported between a range of $[k_{t-1}\ k_{t+1}]$ or over a 2 h interval, and otherwise zero (0) outside this range. As shown in expression (36), the first order B-Spline basis function comprises three terms each of which comprises a respective knot multiplication factor (denoted as $c_i$, where i represents an integer between 0 and 2) multiplied with a difference between an input value (e.g., an input or source codeword used to predict a target codeword approximating a reference codeword, etc.) and a respective knot point. For example, the first knot multiplication factor for the first term in expression (36) is $$\frac{1}{h};$$

the second knot multiplication factor for the second term in expression (36) is $$-\frac{2}{h};$$

the third knot multiplication factor for the third term in expression (36) is $$\frac{1}{h}.$$

The 2nd order of the $t^{th}$ B-Spline basis function can be constructed with a linear combination of truncated polynomials as follows:

$$B_t^2(x) = \frac{1}{2}\left(\frac{1}{h}\right)^2 [(x-k_{t-1})_+^2 - 3(x-k_t)_+^2 + 3(x-k_{t+1})_+^2 - (x-k_{t+2})_+^2] \tag{37}$$

where $B_t^2(x)$ is only positive or supported between a range of $[k_{t-1}\ k_{t+2}]$ or over a 3 h interval, and otherwise zero (0) outside this range. As shown in expression (37), the 2nd order B-Spline basis function comprises four terms each of which comprises a respective knot multiplication factor (denoted as $c_i$, where i represents an integer between 0 and 3) multiplied with a difference between an input value (e.g., an input or source codeword used to predict a target codeword approximating a reference codeword, etc.) and a respective knot point. For example, the first knot multiplication factor for the first term in expression (37) is $$\frac{1}{2}\left(\frac{1}{h}\right)^2;$$

the second knot multiplication factor for the second term in expression (37) is $$-\frac{3}{2}\left(\frac{1}{h}\right)^2;$$

the third knot multiplication factor for the third term in expression (37) is $$\frac{3}{2}\left(\frac{1}{h}\right)^2;$$

the fourth knot multiplication factor for the fourth term in expression (37) is $$\frac{1}{2}\left(\frac{1}{h}\right)^2.$$

The 3rd order of the $t^{th}$ B-Spline basis function can be constructed with a linear combination of truncated polynomials as follows:

$$B_t^3(x) = \frac{1}{6} \quad (38)$$
$$\left(\frac{1}{h}\right)^3 \left[(x-k_{t-2})_+^3 - 4(x-k_{t-1})_+^3 + 6(x-k_t)_+^3 - 4(x-k_{t+1})_+^3 + (x-k_{t+2})_+^3\right]$$

where $B_t^3(x)$ is only positive or supported between a range of $[k_{t-2}\ k_{t+2}]$ or over an 4 h interval, and otherwise zero (0) outside this range. As shown in expression (38), the 3rd order B-Spline basis function comprises five terms each of which comprises a respective knot multiplication factor (denoted as $c_i$, where i represents an integer between 0 and 4) multiplied with a difference between an input value (e.g., an input or source codeword used to predict a target codeword approximating a reference codeword, etc.) and a respective knot point. For example, the first knot multiplication factor for the first term in expression (38) is $$\frac{1}{6}\left(\frac{1}{h}\right)^3;$$

the second knot multiplication factor for the second term in expression (38) is $$-\frac{4}{6}\left(\frac{1}{h}\right)^3;$$

the third knot multiplication factor for the third term in expression (38) is $$\frac{6}{6}\left(\frac{1}{h}\right)^3;$$

the fourth knot multiplication factor for the fourth term in expression (38) is $$-\frac{4}{6}\left(\frac{1}{h}\right)^3;$$

the fifth knot multiplication factor for the fifth term in expression (38) is $$\frac{1}{6}\left(\frac{1}{h}\right)^3.$$

Having these polynomial expressions for B-Spline basis functions allows a video content processor such as an encoder, a decoder, a transcoder, etc., to use polynomials for B-Spline basis functions and avoid recursively obtaining B-Spline basis functions. This simplifies hardware implementation as it may be relatively complicated to implement a recursive B-Spline expression. The recursive expression would also likely take relatively long time and relatively large memory space to compute and store. The truncated polynomial expression can be used to save computation by trading the flexibility of having non-uniform (e.g., adaptive, etc.) knot points.

Additionally, optionally or alternatively, a n-th order B-Spline basis functions $B_t^n(x)$ is positive by crossing (n+1)h intervals. Given a point x, only (n+1) basis functions comprise support or possible positive values over ranges that cover the point x. As a result, only these (n+1) basis function get activated for the given point x. The remaining basis functions are zero (0) at the given point x, since the given point x is outside ranges in which the remaining basis function are non-zero. To construct TPB basis functions for three color channels or dimensions, not all B-Spline basis functions, but rather only $(n+1)^3$ B-Spline basis functions get activated. This significantly reduces potentially numerous multiplications from the (original) total number $(D^y=D_0^y \cdot D_1^y \cdot D_2^y)$ of B-Spline basis functions.

Decoder Implementation

Figure 1B:
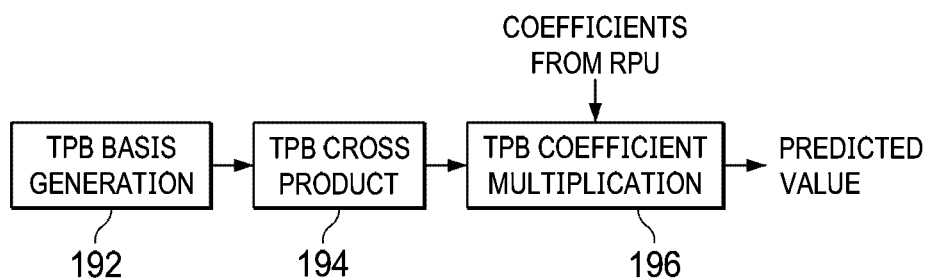
FIG. 1B illustrates example processing blocks for TPB cross-channel prediction.

FIG. 1B illustrates example processing blocks for TPB cross-channel prediction, which may be implemented in a video content processor (e.g., a decoder, an encoder, a transcoder, etc.) with one or more computer processors. Some or all of these processing blocks may be implemented in hardware, software or a combination of hardware and software.

Block 192 comprises TPB basis generation operations that prepare B-Spline basis function $B_t^n(x)$ in each channel or dimension, output $D^y$ different values from each basis function in the Y channel or dimension, output $D^{Cb}$ different values from each basis function in the Cb channel or dimension, output $D^{Cr}$ different values from each basis function in the Cr channel or dimension, and so forth. Since there are only (n+1) non-zero value in each channel or dimension, if we only output non-zero signal or value out, there are only 3*(n+1) non-zero signals or values from 3 channels or dimensions. Operations in this block may be pre-configured, fixed and/or pre-executed without waiting for video content or image metadata to be received, as long as the knot points for the B-Spline basis functions are pre-configured, fixed or otherwise available.

Block 194 comprises TPB cross-product operations that perform cross-product multiplications from one-dimensional B-Spline basis functions to construct higher-dimensional TPB basis functions, as follows:

Luma: $B_{j,t^{c0},t^{c1}}^{TPB,y}(v_{ji}^y, v_{ji}^{c0}, v_{ji}^{c1}) = B_{j,t}^{y,0}(v_{ji}^y) \cdot B_{j,t^{c0,1}}(v_{ji}^{c0}) \cdot B_{j,t^{c1,2}}(v_{ji}^{c1})$ (39-1)

Chroma: $B_{j,t^{c0},t^{c1}}^{TPB,c}(v_{ji}^y, v_{ji}^{c0}, v_{ji}^{c1}) = B_{j,t}^{c,0}(v_{ji}^y) \cdot B_{j,t^{c0,1}}(v_{ji}^{c0}) \cdot B_{j,t^{c1,2}}(v_{ji}^{c1})$ (39-2)

Since there are (n+1) non-zero value in each channel or dimension, there are $(n+1)^3$ multiplications and $(n+1)^3$ outputs from block 194. Operations in this block may be fixed but indices (or indexes) to be used for TPB prediction may need to be tracked.

Block 196 comprises TPB coefficient multiplication operations that multiply the non-zero values outputted from block 194 with prediction parameters/coefficients $\{m_{j,t}^{TPB,y}\}$ read from image metadata (e.g., composer metadata) delivered with video content in a received video signal. There are $(n+1)^3$ multiplications to weight each high dimension basis function and additions to sum up all values to generate final predicted values $\hat{s}_{ji}^{y}$, $\hat{s}_{ji}^{c0}$ and $\hat{s}_{ji}^{c1}$, as follows:

$$\text{Luma: } \hat{s}_{ji}^{y} = \Sigma_{t=0}^{D^y-1} m_{j,t}^{TPB,y} \cdot B_{j,t}^{TPB,y}(v_{ji}^{y}, v_{ji}^{c0}, v_{ji}^{c1}) \quad (40\text{-}1)$$

$$\text{Chrom: } \hat{s}_{ji}^{c} = \Sigma_{t=0}^{D^c-1} m_{j,t}^{TPB,c} \cdot B_{j,t}^{TPB,y}(v_{ji}^{y}, v_{ji}^{c0}, v_{ji}^{c1}) \quad (40\text{-}2)$$

where C represents either C0 or C1.

Operations in block 196 may dynamically identify and/or allocate basis indexes and parameter indexes.

Figure 1C:
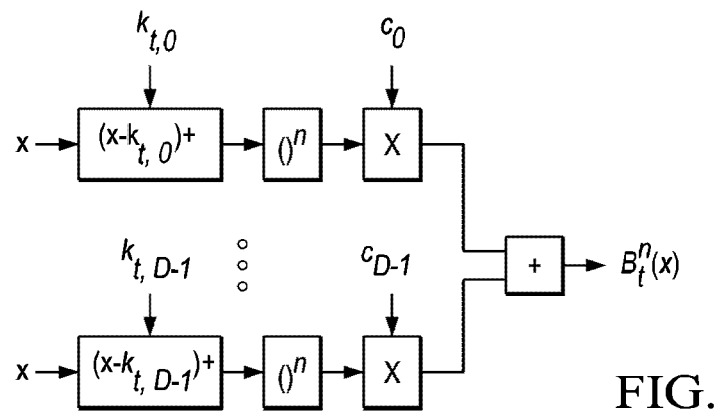
FIG. 1C and FIG. 1D illustrate example implementations of TPB basis generation operations.
Figure 1D:
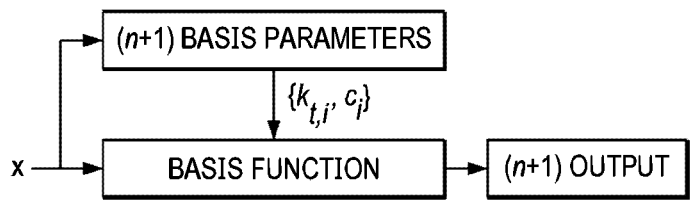

FIG. 1C and FIG. 1D illustrate example implementations of TPB basis generation operations in block 192 of FIG. 1B.

FIG. 1C illustrates an example equation-based implementation of generation of B-Spline basis function outputs, which can then be used to generate tensor products representing TPB basis function outputs. In some operational scenarios, the equation-based implementation of FIG. 1C may be based on any of expressions (36) through (38) for the first order through 3rd order B-Spline basis functions. In some operational scenarios, the equation-based implementation of FIG. 1C may be based on a truncated polynomial expression similar to expressions (36) through (38) for B-Spline basis functions of an order other than the first order through 3rd order.

As illustrated in FIG. 1C, an output value of the t-th B-Spline basis function (which may be used to form TPB basis functions with expression (24) above) can be computed using an input x (e.g., an input or source codeword at least based in part on which a target codeword approximating a reference codeword in a channel or dimension of a color space is predicted, etc.) and B-Spline basis function parameters such as (e.g., fixed, etc.) knot points $k_{t,i}$ and knot multiplication parameters $c_i$. Output values of corresponding TPB basis functions can then be generated as tensor products of output values of the B-Spline basis functions.

In some operational scenarios, the equation-based implementation of FIG. 1C can be instantiated into a relatively large number of instances or threads running in parallel. In some operational scenarios, the equation-based implementation of FIG. 1C can be reused, for example in a single thread or a relatively few threads, by loading different basis function parameters if the hardware (e.g., processing logic or processor implementing this equation-based approach, etc.) operates in a relatively high frequency.

As illustrated in FIG. 1D, the output for each B-Spline basis function can be stored in local registers. As mentioned before, there are only (n+1) non-zero outputs from a corresponding number of B-Spline basis functions. Thus, for a given input value x, only (n+1) basis function outputs need to be completed.

The selected (n+1) non-zero output can be quickly indexed using most-significant-bits or MSBs if the number of internal knot points is power of 2 plus 1. Then the interval between two (e.g., consecutive, adjacent, etc.) internal knot points $\{k_{t,i}\}$ is simply power of 2. Specific outputs and number of non-zero outputs can be simply identified using the MSB bits.

Additionally, optionally or alternatively, outputs of B-Spline basis functions may be lookup table (LUT) based, in addition to or in place of the equation-based implementation. For example, in some operational scenarios, a 1D-LUT can be built for each 1-D B-Spline basis function. For example, a number of LUT entries (e.g., totaling to $D_0^y + D_1^y + D_2^y$, etc.) may be stored for each channel or dimension, respectively. If cache or memory space is relatively large enough, then all entries for all $D^y$ basis functions may be concurrently stored. It should also be noted that with uniformly distributed knot points, B-Spline basis functions along each channel or dimension are simple shifted versions of one of the B-Spline basis functions, as illustrated in FIG. 3A through FIG. 3D. This property may be exploited to enable relatively efficient solution in both hardware and software design and in both memory space and computations. Outputs of B-Spline functions may be generated with applying shift operations to an input based on a plurality of offsets. As a result, the 1D-LUT may just need to cover (n+1) h intervals instead of an entire input value (e.g., signal, codeword, etc.) range, thereby greatly reducing the number of needed LUT entries. The only additional logic to add or implement may be the shift operations of the offsets. If hardware or processors can operate in a relatively high frequency, generation of outputs of different B-Spline basis functions in the same channel or dimension can share the same processing logic, for example with different offsets.

Figure 1E:
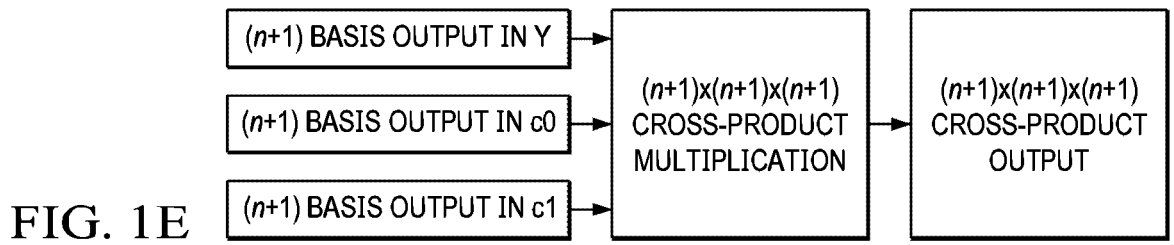
FIG. 1E and FIG. 1F illustrate example implementations of TPB cross product operations.
Figure 1F:
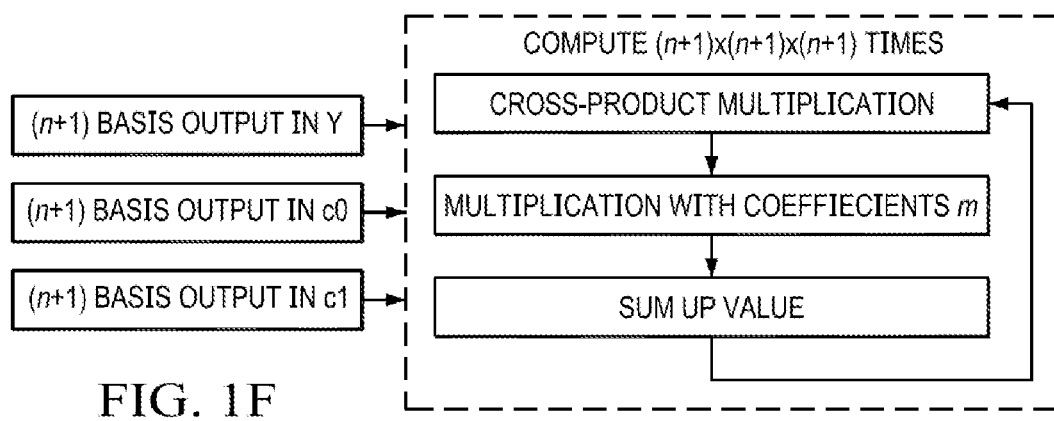

FIG. 1E and FIG. 1F illustrate example implementations of TPB cross product operations in block 194 of FIG. 1B.

FIG. 1E illustrates example TPB cross product operations in a parallel mode. As illustrated in FIG. 1E, for each channel or dimension, (n+1) outputs are generated from each channel's B-Spline basis functions. For each channel or dimension, the TPB cross product operations in block 194 perform $(n+1)^3$ multiplications for the respective (n+1) outputs and store multiplication (or tensor product) results as TPB cross product outputs (e.g., as shown in expression (24), etc.), for example in output registers. The TPB cross product outputs are then provided to block 196 to be multiplied with (e.g., encoder-generated, generated by an upstream video content processor, etc.) prediction coefficients (e.g., $m_j^{TPB,y}, m_j^{TPB,c0}, m_j^{TPB,c1}$, etc.), for example from image metadata received in or decoded from a video signal, using expressions (34).

FIG. 1F illustrates example TPB cross product operations in a serial or sequential mode. As illustrated in FIG. 1F, if the TPB cross product operations can be done in a relatively high speed with processing logic of a relatively high frequency, the TPB cross product operations in block 194 and TPB coefficient multiplication operations in block 196 can be merged together. Depending on hardware capabilities and footprints, the $(n+1)^3$ terms can be partitioned into N group, where N is a positive integer; each of the N groups has its own multipliers to complete the TPB cross product operations and corresponding TPB coefficient multiplication, for example by repeating $(n+1)^3/N$ times in a "for" loop. N represents a hardware design parameter to achieve specific design performance targets including but not limited to speed, die size, clock frequency, etc.

Figure 1G:
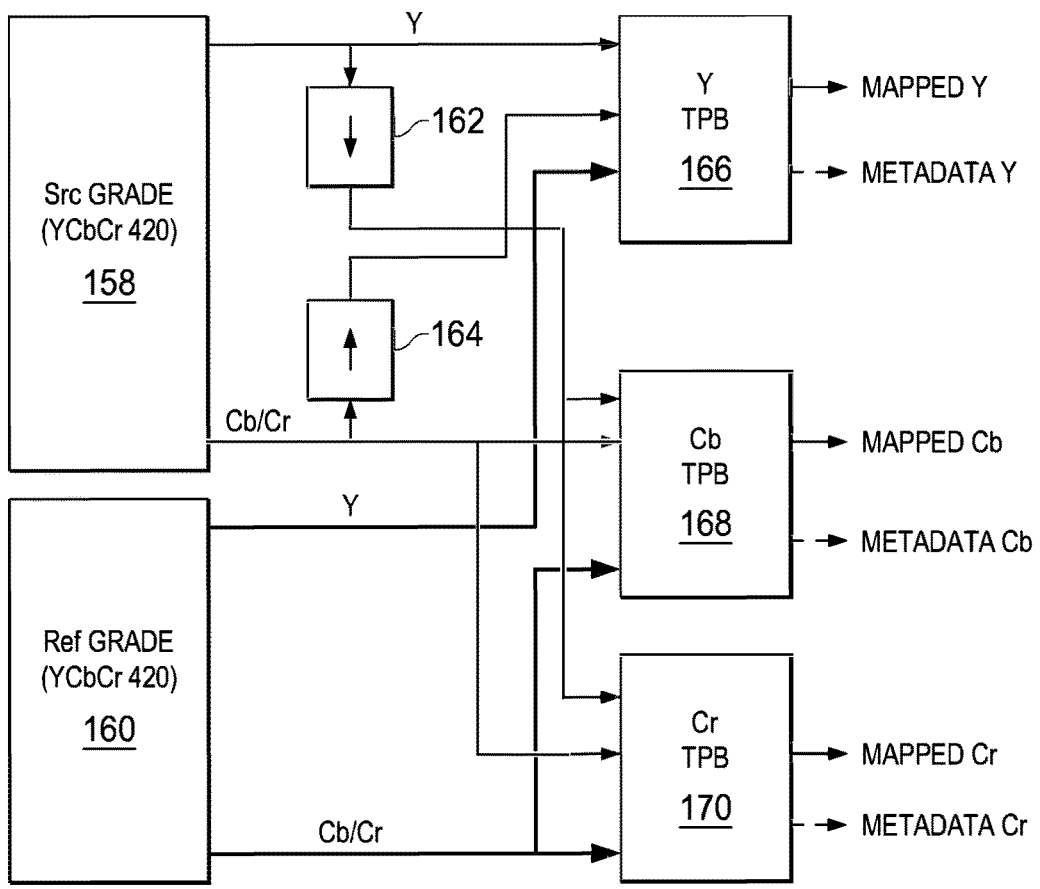
FIG. 1G and FIG. 1H illustrate example flowcharts for applying TPB prediction.
Figure 1H:
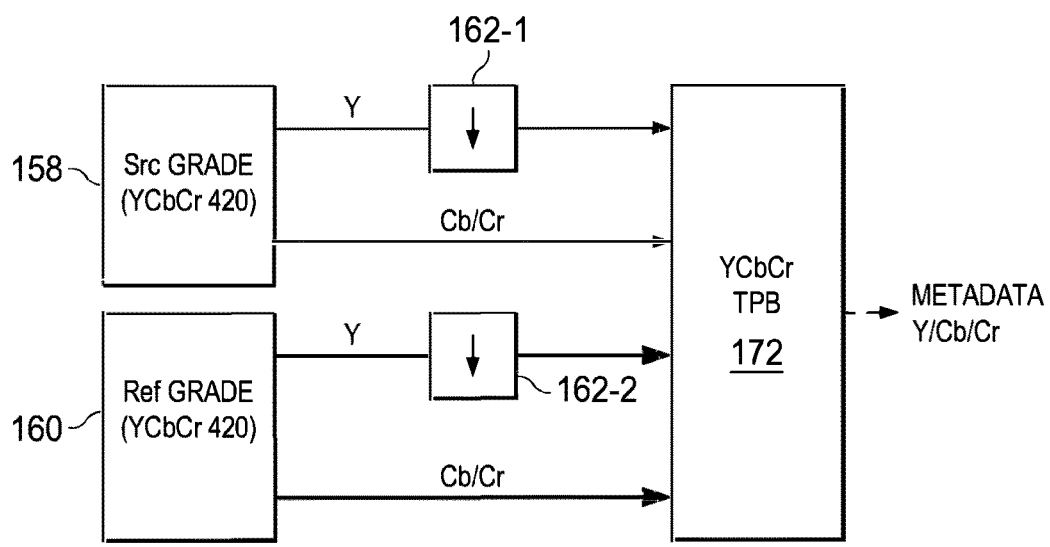

FIG. 1G and FIG. 1H illustrate example flowcharts for applying TPB prediction to an input or source color grade 158 of video content to generate a target or mapped color grade comprising TPB predicted (e.g., target, mapped, etc.) codewords approximating reference codewords in a reference code grade 160 of video content. Flowcharts similar to those of FIG. 1G and FIG. 1H may be implemented on the encoder side to generate the target or mapped color grade as predicted from the input or source color grade (158) approximating the reference code grade (160) of video content. Some or all of these flowcharts may be implemented in software, hardware, a combination of software and hardware, etc., and may be performed by one or more computer processors.

By way of illustration only, the color grades (158) and (160) may be coded in a subsampling format such as 4:2:0 in a YCbCr color space. In the 4:2:0 subsampling format, chroma or chrominance codewords (Cb and Cr) are quarter size of luma or luminance codeword. To perform cross-color-channel prediction, such as TPB cross-channel prediction, sizes (or dimensions) of the codewords may be aligned (e.g., upsampled as appropriate, downsampled as appropriate, etc.) for all input or source color channels.

As illustrated in FIG. 1G, for TPB luma prediction, chroma or chrominance codewords (Cb/Cr) of the source color grade (158) may be upsampled by a processing block 164. The upsampled chroma codewords are outputted by the processing block (164) to a TPB luminance prediction block 166. The upsampled chroma codewords in combination of luma or luminance codewords (Y) of the source code grade (158) of the same sizes (or dimensions) may be used by the TPB luminance prediction block (166) to make prediction of mapped or reshaped luma or luminance codewords approximating luma or luminance codewords in the reference color grade (160).

As illustrated in FIG. 1G, for TPB chroma Cb prediction, the luma codewords (Y) of the source color grade (158) may be downsampled by a processing block 162. The downsampled luma codewords are outputted by the processing block (162) to a TPB chroma Cb prediction block 168. The downsampled luma codewords in combination of the chroma codewords of the source code grade (158) of the same sizes (or dimensions) may be used by the TPB chroma Cb prediction block (168) to make prediction of mapped or reshaped chroma Cb codewords approximating chroma Cb codewords in the reference color grade (160).

As illustrated in FIG. 1G, for TPB chroma Cr prediction, the downsampled luma codewords are outputted by the processing block (162) to a TPB chroma Cr prediction block 170. The downsampled luma codewords in combination of the chroma codewords of the source code grade (158) of the same sizes (or dimensions) may be used by the TPB chroma Cr prediction block (170) to make prediction of mapped or reshaped chroma Cr codewords approximating chroma Cr codewords in the reference color grade (160).

In some operational scenarios, as illustrated in FIG. 1H, only downsampled luma codewords derived from downsampling (e.g., with processing blocks 162-1 and 162-2, etc.) luma codeword of the source color grade (158) are used by an overall TPB prediction block 172 to obtain TPB predictions and TPB prediction parameters or coefficients for all channels. This significantly reduces memory consumption, as only luminance downsampling is used.

In some operational scenarios, on the encoder side, TPB prediction parameters or coefficients may be generated by TPB prediction blocks (e.g., 166, 168, 170, 172, etc.) as solutions that minimizes differences between the mapped or reshaped luma/chroma codewords with the aligned (e.g., upsampled as appropriate, downsampled as appropriate, etc.) luma/chroma codewords of the reference color grade (160). The TPB prediction parameters or coefficients can be encoded in a video signal to downstream video content processors as a part (e.g., composer metadata) of image metadata.

In some operational scenarios, on the decoder side, TPB prediction parameters or coefficients may be decoded by a downstream recipient device from the video signal as a part of the image metadata. A decoded version of the source color grade (158) may also be decoded by the device from the video signal. The TPB prediction parameters or coefficients may be used by the device to generate mapped or reshaped images representing a reconstructed color grade that closely approximates the reference color grade (160). The mapped or reshaped images may be rendered on a display device as a different color grade from the decoded version of the source color grade (158).

Additionally, optionally or alternatively, in some operational scenarios, the total number of knot points and the B-Spline order are the same for both luma and chroma channels, computation can be even more reduced. For example, in a three-stage implementation as illustrated in FIG. 1B, two stages, namely TPB basis generation and TPB cross product, are the same for all three channels or dimensions. Thus, the only difference among the channels is different TPB prediction parameters/coefficients used in TPB coefficient multiplication in a single stage. It should be noted that, in some other embodiments or implementations, the number of knots may be different for different color channels for the purpose of providing additional flexibility or tradeoffs in achieving performance and/or accuracy.

3DMT-Based TPB Prediction

In some operational scenarios, TPB prediction may be implemented using codeword histograms or distributions generated based on 3-D Mapping Table (3DMT) techniques.

Let $v_i=[v_i^y v_i^{c0} v_i^{c1}]^T$ be a first 3D array comprising first luma and chroma codewords of the i-th pixel from a first image (e.g., an input or source image, etc.), such as an HDR image, of a first color grade of video content. Let $s_i=[s_i^y s_i^{c0} s_i^{c1}]^T$ be a second 3D array comprising second luma and chroma codewords of the i-th pixel from a second image (which corresponds to, or depicts the same visual content, as the first image; e.g., a reference image, etc.), such as an SDR image, of a second color grade of video content.

Three channel luma and chroma codeword values (Y, $C_0$ and $C_1$) used to represent image content of the first color grade may be respectively quantized or counted into a fixed number of 1D bins (e.g., a first fixed number $Q_y$ of luma bins, a second fixed number $Q_{c0}$ of chroma Cb bins, a third fixed number $Q_{C_1}$ of chroma Cb bins, etc.) for each channel or component. A 3D histogram, denoted as $\Omega^{Q,v}$ (where $Q=[Q_y, Q_{c_0}, Q_{C_1}]$, with a fixed number of $(Q_y \times Q_{c_0} \times Q_{C_1})$ 3D bins may be constructed using the 1D bins for the first color grade. In some operational scenarios, a first three-channel luma and codeword chroma space comprising all possible luma and chroma codeword values for encoding the first color grade may be uniformly partitioned into the fixed number of $(Q_y \times Q_{c_0} \times Q_{C_1})$ 3D bins with each channel uniformly partitioned into the fixed number of 1D bins (e.g., the first fixed number $Q_y$ of luma bins, the second fixed number $Q_{c0}$ of chroma Cb bins, the third fixed number $Q_{c1}$ of chroma Cb bins, etc.).

Thus, the 3D histogram $\Omega^{Q,v}$ contains total $(Q_y \cdot Q_{c_0} \cdot Q_{C_1})$ bins such that each 3D bin can be specified by a respective bin index $q=(q_y, q_{c_0}, q_{C_1})$; the bin represents or keeps a count of the number of pixels in the first image (of the first color grade) having three-channel quantized values falling within boundaries of the 3D bin.

In addition, a sum of each color component in the second image (of the second color grade; e.g., the reference image to be approximated by a mapped image of the first image, etc.) may be maintained in or for each 3D bin of the 3D histogram $\Omega^{Q,v}$. Let $\Psi_y^{q,s}$, $\Psi_{C_0}^{Q,s}$ and $\Psi_{c_1}^{Q,s}$ be sums, respectively, of (reference) luma and chroma codeword values in the $2^{nd}$ image domain such that each 3D bin contains the sums of luma and chroma ($C_0$ and $C_1$) codeword values of pixels in the second image, where the pixels in the second image correspond to the pixels, of the first image, a count of which is stored in the same 3D bin.

Assume each of the first and second images has P pixels. An example procedure to generate 3D bins with the counts of pixels of the first image of the first color grade and the sums of codeword values of pixels—corresponding to the pixels of the first image—of the second image of the second color grade is illustrated in TABLE 4 below.

TABLE 4

// STEP 1: initialization
$\Omega_q^{Q,v} = 0$ where $q = (q_y, q_{C_0}, q_{C_1})$ and $q_{ch} = 0, ..., Q_{ch} - 1$, for each $ch = \{y, C_0, C_1\}$
$\Psi_{y,q}^{Q,s} = 0$ where $q = (q_y, q_{C_0}, q_{C_1})$ and $q_{ch} = 0, ..., Q_{ch} - 1$, for each $ch = \{y, C_0, C_1\}$
$\Psi_{C_0,q}^{Q,s} = 0$ where $q = (q_y, q_{C_0}, q_{C_1})$ and $q_{ch} = 0, ..., Q_{ch} - 1$, for each $ch = \{y, C_0, C_1\}$
$\Psi_{C_1,q}^{Q,s} = 0$ where $q = (q_y, q_{C_0}, q_{C_1})$ and $q_{ch} = 0, ..., Q_{ch} - 1$, for each $ch = \{y, C_0, C_1\}$
// STEP 2: scan for each pixel in input image; compute histogram and sum
for ( i = 0 ; i < P ; i ++ ){

$q_y = \left\lfloor \dfrac{v_i^y}{Q_y} \right\rfloor$; // first image's luma quantized value $q_{C_0} = \left\lfloor \dfrac{v_i^{C_0}}{Q_{C_0}} \right\rfloor$; // first image's chroma 0 quantized value $q_{C_1} = \left\lfloor \dfrac{v_i^{C_1}}{Q_{C_1}} \right\rfloor$; // first image's chroma 1 quantized value $q = (q_y, q_{C_0}, q_{C_1})$,
$\Omega_q^{Q,v}$ ++; // 3D histogram in $1^{st}$ image
$\Psi_{y,q}^{Q,s} = \Psi_{y,q}^{Q,s} + S_i^y$; // second image's y values
$\Psi_{C_0,q}^{Q,s} = \Psi_{C_0,q}^{Q,s} + S_i^{c0}$; // second image's $C_0$ values
$\Psi_{C_1,q}^{Q,s} = \Psi_{C_1,q}^{Q,s} + S_i^{c1}$; // second image's $C_1$ values
}

Let $(s_q^{y,(B)}, s_q^{C_0,(B)}, s_q^{C_1,(B)})$ represent the center of q-th SDR bin of the 3D histogram $\Omega^{Q,v}$. These center values are fixed for all images of the first color grade and can be precomputed. Corresponding reference or target HDR values to which the center values are approximated may be obtained using an example procedure illustrated in TABLE 5 below.

TABLE 5

// Recall that the bin index $q = (q_y, q_{C_0}, q_{C_1})$.
for ($q_y = 0$; $q_y < Q_y$ ; $q_y$ ++)
  for ($q_{C_0} = 0$; $q_{C_0} < Q_{C_0}$; $q_{C_0}$ ++)
    for ($q_{C_1} = 0$; $q_{C_1} < Q_{C_1}$ ; $q_{C_1}$ ++) {

$v_q^{y,(b)} = \dfrac{(q_y + 0.5)}{Q_y}$

//normalized bin-value luma component in $1^{st}$ image $v_q^{C_0,(B)} = \dfrac{(q_{C_0} + 0.5)}{Q_{C_0}}$ // normalized bin-value C0 component in $1^{st}$ image $v_q^{C_1,(B)} = \dfrac{(q_{C_1} + 0.5)}{Q_{C_1}}$ // normalized bin-value C1 component in $1^{st}$ image
}

In some operational scenarios, in the 3D histogram $\Omega^{Q,v}$, 3D bins each with non-zero pixel counts for pixels in the first image of the first color grade are identified and kept, while all other 3D bins each with zero pixel counts (or relatively small pixel counts below a given pixel count threshold) for pixels in the first image of the first color grade are discarded. Let $q_0, q_1, \ldots q_{k-1}$, be k such bins for which, $\Omega_q^{Q,v} \neq 0$. The averages of $\Psi_{y,q}^{Q,s}$, $\Psi_{c_0,q}^{Q,s}$, and $\Psi_{c_1,q}^{Q,s}$ can be computed with an example procedure illustrated in TABLE 6 below.

TABLE 6

// The non-zero bin index $q_i = (q_y, q_{C_0}, q_{C_1})$.
for (i=0; i < k; i++) {

$\bar{\Psi}_{y,q_i}^{Q,s} = \dfrac{\Psi_{y,q_i}^{Q,s}}{\Omega_{q_i}^{Q,v}}$;   // Average 3D-Mapping $2^{nd}$ image y values $\bar{\Psi}_{C_0,q_i}^{Q,s} = \dfrac{\Psi_{C_0,q_i}^{Q,s}}{\Omega_{q_i}^{Q,v}}$;   // Average 3D-Mapping $2^{nd}$ image $C_0$ values $\bar{\Psi}_{C_1,q_i}^{Q,s} = \dfrac{\Psi_{C_1,q_i}^{Q,s}}{\Omega_{q_i}^{Q,v}}$;   // Average 3D-Mapping $2^{nd}$ image $C_1$ values

}

For a given valid bin index (e.g., a bin index with non-zero pixel count, etc.), a mapping pair comprising to-be-mapped luma and chroma codeword values (as represented by the center values of a 3D bin with the bin index) of the first image of the first color grade and reference luma and chroma codeword values (as represented by the averages of the sums of luma and chroma codeword values of corresponding pixels) of the second image of the second color grade to be approximated by a mapped image may be obtained, as follows:

$$v_q^{(B)} = [v_q^{y,(B)} v_q^{C_0,(B)} v_q^{C_1,(B)}]^T \qquad (41\text{-}1)$$

$$\bar{\Psi}_q^{Q,s} = [\bar{\Psi}_{y,q}^{Q,s} \bar{\Psi}_{c_0,q}^{Q,s} \bar{\Psi}_{c_1,q}^{Q,s}]^T \qquad (41\text{-}2)$$

Based on the 3DMT (or the 3D bins generated thereunder), TPB cross-channel prediction of mapped values $\hat{\Psi}_{y,q}^{Q,s}$ and $\hat{\Psi}_{c,q}^{Q,s}$ from the center values of the 3D bin as represented in expression (41-1) to approximate the reference values as represented in expression (41-2) can be performed as follows:

Luma:
$$\hat{\Psi}_{y,q}^{Q,s} = \Sigma_{t=0}^{D^y-1} m_{j,t}^{TPB,y} B_{j,t}^{TPB,y}(v_q^{y,(B)}, v_q^{C_0,(B)}, v_q^{C_1,(B)}) \quad (42\text{-}1)$$

Chroma:
$$\hat{\Psi}_{c,q}^{Q,s} = \Sigma_{t=0}^{D^c-1} m_{j,t}^{TPB,c} B_{j,t}^{TPB,c}(v_q^{y,(B)}, v_q^{C_0,(B)}, v_q^{C_1,(B)})$$

TPB predictor parameters or coefficients $m_{j,t}^{TPB,y}$ can be obtained via similar processing to that in the individual-pixel-based solution. A design matrix and a target vector can be constructed by taking input values from a mapping table comprising all mapping pairs (e.g., expressions 41 above, etc.) for all valid 3D bins.

For TPB luma prediction, the design matrix and the target vector can be constructed as follows:

$$S_j^{TPB,y} = \begin{bmatrix} B_{j,0}^{TPB,y}(v_0^{y,(B)}, v_0^{C_0,(B)}, v_0^{C_1,(B)}) & B_{j,1}^{TPB,y}(v_0^{y,(B)}, v_0^{C_0,(B)}, v_0^{C_1,(B)}) & \cdots & B_{j,D^y-1}^{TPB,y}(v_0^{y,(B)}, v_0^{C_0,(B)}, v_0^{C_1,(B)}) \\ B_{j,0}^{TPB,y}(v_1^{y,(B)}, v_1^{C_0,(B)}, v_1^{C_1,(B)}) & B_{j,1}^{TPB,y}(v_1^{y,(B)}, v_1^{C_0,(B)}, v_1^{C_1,(B)}) & \cdots & B_{j,D^y-1}^{TPB,y}(v_1^{y,(B)}, v_1^{C_0,(B)}, v_1^{C_1,(B)}) \\ \vdots & \vdots & & \vdots \\ B_{j,0}^{TPB,y}(v_{k-1}^{y,(B)}, v_{k-1}^{C_0,(B)}, v_{k-1}^{C_1,(B)}) & B_{j,1}^{TPB,y}(v_{k-1}^{y,(B)}, v_{k-1}^{C_0,(B)}, v_{k-1}^{C_1,(B)}) & \cdots & B_{j,D^y-1}^{TPB,y}(v_{k-1}^{y,(B)}, v_{k-1}^{C_0,(B)}, v_{k-1}^{C_1,(B)}) \end{bmatrix} \quad (43)$$

$$s_j^y = \begin{bmatrix} \Psi_{y,0}^{Q,s} \\ \Psi_{y,1}^{Q,s} \\ \vdots \\ \Psi_{y,k-1}^{Q,s} \end{bmatrix} \quad (44)$$

For TPB chroma prediction, the design matrix and the target vector can be constructed as follows:

$$S_j^{TPB,c} = \begin{bmatrix} B_{j,0}^{TPB,c}(v_0^{y,(B)}, v_0^{C_0,(B)}, v_0^{C_1,(B)}) & B_{j,1}^{TPB,c}(v_0^{y,(B)}, v_0^{C_0,(B)}, v_0^{C_1,(B)}) & \cdots & B_{j,D^y-1}^{TPB,c}(v_0^{y,(B)}, v_0^{C_0,(B)}, v_0^{C_1,(B)}) \\ B_{j,0}^{TPB,c}(v_1^{y,(B)}, v_1^{C_0,(B)}, v_1^{C_1,(B)}) & B_{j,1}^{TPB,c}(v_1^{y,(B)}, v_1^{C_0,(B)}, v_1^{C_1,(B)}) & \cdots & B_{j,D^y-1}^{TPB,c}(v_1^{y,(B)}, v_1^{C_0,(B)}, v_1^{C_1,(B)}) \\ \vdots & \vdots & & \vdots \\ B_{j,0}^{TPB,c}(v_{k-1}^{y,(B)}, v_{k-1}^{C_0,(B)}, v_{k-1}^{C_1,(B)}) & B_{j,1}^{TPB,c}(v_{k-1}^{y,(B)}, v_{k-1}^{C_0,(B)}, v_{k-1}^{C_1,(B)}) & \cdots & B_{j,D^y-1}^{TPB,c}(v_{k-1}^{y,(B)}, v_{k-1}^{C_0,(B)}, v_{k-1}^{C_1,(B)}) \end{bmatrix} \quad (45)$$

$$s_j^c = \begin{bmatrix} \Psi_{c,0}^{Q,s} \\ \Psi_{c,1}^{Q,s} \\ \vdots \\ \Psi_{c,k-1}^{Q,s} \end{bmatrix} \quad (46)$$

A solution for TPB prediction parameters or coefficients can be obtained via the least squared solution, as follows:

$$m_j^{TPB,y,(opt)} = ((s_j^{TPB,y})^T S_j^{TPB,y})^{-1}((S_j^{TPB,y})^T s_j^y) \quad (47)$$

$$m_j^{TPB,c,(opt)} = ((s_j^{TPB,c})^T S_j^{TPB,c})^{-1}((S_j^{TPB,c})^T s_j^y) \quad (48)$$

The 3DMT-based TPB prediction techniques can be used to provide relatively fast computation speed. Instead of constructing a B and a matrix from all P individual pixels for each image pair, k entries from a mapping table comprising mapping pairs based on 3D bins may be used. In some operational scenarios, k may be kept or constrained or selected within a range of thousands, much smaller than P, which may be in a range of millions or even more. The order of magnitude for savings in computation may be 3.

Additionally, optionally or alternatively, the 3DMT-based TPB prediction techniques can be used to alleviate or prevent a majority-and-minority issue that may favor or overly weight toward relatively big image regions/areas in an image at the expense of relatively small image regions/areas in the same image. Having a relatively equitable weight in each color cube as represented by a 3D bin can help reduce color artifact and increase color precision.

Scene/Segment/Linear-Based TPB Prediction

TPB prediction as described herein may be performed using a scene based, segment based, and/or linear based encoding architecture.

Suppose there are F images/frames in one scene depicted in video content of a video signal, using a scene-based architecture, all B and a from all frames within this scene may be summed as follows:

$$B = \sum_{j=0}^{F-1} B_j \quad (49)$$

$$a = \sum_{j=0}^{F-1} a_j \quad (50)$$

It should be note that in various embodiments, B and a in expressions (49) or (50) can be constructed either from pixel based or 3DMT based mapping data between different color grades of the video content.

As the B matrix might be in an ill-defined condition with columns (and rows) comprising all zeros (or relatively small values individually or collective below a threshold), these columns (and rows) may be removed from the B matrix, for example using an example procedure as illustrated in TABLE 7 below.

TABLE 7

$\breve{B} = 0_{D \times 0}$
$\Phi = \{ \}$
c = 0;
// remove column
For each column, α, in B
   // sum up the value for each column $$U_\alpha = \sum_{\beta=0}^{D-1} B(\alpha, \beta)$$

// retain the column if the sum is bigger than a threshold
   // add to new matrix
   If($U_\alpha$ > δ)
      $\breve{B} = \lfloor \breve{B}\ B(\alpha,:) \rfloor$
      $\Phi = \Phi \cup \alpha$
      c ++
   end
end
$\tilde{B} = 0_{0 \times c}$
// remove row
For each row, β, in B
   If(β in Φ)

$$\tilde{B} = \begin{bmatrix} \tilde{B} \\ \breve{B}(:, \beta) \end{bmatrix}$$

End
End

Similarly, as matrix a might be in an ill-defined condition with rows corresponding to columns (and rows) identified and excluded from matrix B, these entries in matrix a may be removed. An example procedure for identifying these entries in matrix a is illustrated in TABLE 8 below.

TABLE 8

$\tilde{a} = 0_{0 \times 0}$
// remove row
For each row, β, in a
   If( β in Φ)

$$\tilde{a} = \begin{bmatrix} \tilde{a} \\ a(\beta) \end{bmatrix}$$

End
End

A solution for scene-based TPB prediction can be found as follows:

$$\tilde{m}^{opt} = (\tilde{B})^{-1} \tilde{a}$$

An example procedure for generating all TPB prediction parameters or coefficients (including those corresponding to the columns/rows identified and excluded from the B matrix) is illustrated in TABLE 9 below.

TABLE 9

For α = 0 : 1 : D −1
   If( α is in Φ )
      Find corresponding index α' in Φ for α
      $m^{opt}(\alpha) = \tilde{m}^{opt}(\alpha')$
   Else
      $m^{opt}(\alpha) = 0$
   end
end In some embodiments, this scene-based TPB prediction method can be applied to a population of training image pairs to determine or derive a static TPB mapping.

Additionally, optionally or alternatively, a segment based and/or linear based encoding architecture may be used to perform TPB prediction. For example, in some operational scenarios, a sliding window approach is used in the segment/linear-based architecture with techniques similar to those used in the above-described scene-based TPB prediction technique. The scene-based TPB prediction techniques or the like can be applied in a sliding window by simply treating a "scene" as the sliding window, or vice versa.

Image Metadata Encoding/Decoding Syntaxes and Semantics

A wide variety of syntaxes and semantics may be used to encode and/or decode image metadata including TPB prediction parameters or coefficient. Example syntaxes and semantics for encoding/decoding image metadata comprising TPB parameters or coefficients are illustrated in TABLE 10 below.

TABLE 10

```
else if( mapping_idc [ y ][ x ][ cmp ] == MAPPING_TPB ) {
    tpb_num_knot_minusl[ y ][ x ][ cmp ][0]              0    ue(v)
    tpb_num_knot_minusl[ y ][ x ][ cmp ][1]              0    ue(v)
    tpb_num_knot_minusl[ y ][ x ][ cmp ][2]              0    ue(v)
    tpb_order_minusl[ y ][ x ][ cmp ][0]                 0    ue(v)
    tpb_order_minusl[ y ][ x ][ cmp ][1]                 0    ue(v)
    tpb_order_minusl[ y ][ x ][ cmp ][2]                 0    ue(v)
    // TPB coefficients
    for( i = 0; i < tpb_num_basis[ y ][ x ][ cmp ][0]; i ++ )
    { // for 1st channel
        for( j = 0; j < tpb_num_basis[ y ][ x ][ cmp ][1]; j ++)
    {// for 2nd channel
        for( k = 0; k < tpb_num_basis[ y ][ x ][ cmp ][2];
    k ++ ) { // for 3rd channel
        tpb_zero_coef[ y ][ x ][ cmp ][ i ][ j ][ k ]    0    u(1)
        if( tpb_zero_coef[ y ][ x ][ cmp ][ i ][ j ][k] == 0 )
    //for non-zero
        tpb_int[ y ][ x ][ cmp ][ i ][ j ][ k ]          0    se(v)
        tpb_coef[ y ][ x ][ cmp ][ i ][ j ][ k ]         0    u(v)
        }
}}}
```

In TABLE 10, "x" and "y" represent two-dimensional indices of image block(s) into which an image/frame is partitioned, and "cmp" represents the number of color space components or channels with which the TPB parameters are associated.

Some of the looping variables used in the coding syntaxes in TABLE 10 are defined as follows:

tpb_num_basis[y][x][cmp][0]=(tpb_num_knot_minus1[y][x][cmp][0]+tpb_order_minus1[y][x][cmp][0]+1)

tpb_num_basis[y][x][cmp][1]=(tpb_num_knot_minus1[y][x][cmp][1]+tpb_order_minus1[y][x][cmp][1]+1)

tpb_num_basis[y][x][cmp][2]=(tpb_num_knot_minus1[y][x][cmp][2]+tpb_order_minus1[y][x][cmp][2]+1)

Semantics of some elements (e.g., represented in differential coding as exponential-Golomb codes, etc.) encoded/decoded with the coding syntaxes of TABLE 10 are defined as follows:

tpb_num_knot_minus1[y][x][cmp][k] specifies the number of knots minus 1 in the kth channel tpb_order_minus1[y][x][cmp][k] specifies the TPB order minus 1 tpb_zero_coef[y][x][cmp][i][j][k] specifies whether the coefficient is zero.

tpb_int[y][x][cmp][i][j][k] specifies the integer portion of fp_tpb_coef[y][x][cmp][i][j][k] when coefficient_data_type is equal to 0. If coefficient_data_type is equal to 1, tpb_int[y][x][cmp][i][j][k] is not present. (For instance, fp_tpb_coef[y][x][cmp][i][j][k] is used to derive a weighting coefficient (e.g., $m^{TPB,y,(opt)}$, $m^{TPB,C0,(opt)}$, $m^{TPB,C1,(opt)}$, etc.) for a corresponding TPB basis function i associated with mapping_idc[y][x][cmp] when coefficient_data_type is equal to 0.)

tpb_coef[y][x][cmp][i] specifies the fractional portion of fp_tpb_coef[y][x][cmp][i][j][k] when coefficient_data_type is equal to 0. If coefficient_data_type is equal to 1, tpb_coef[y][x][cmp][i][j][k] is used to derive the values of the weighting coefficients or the gain coefficients associated with mapping_idc[y][x][cmp]. If coefficient_data_type is equal to 0, the length of the tpb_coef[y][x][cmp][i][j][k] syntax element is coefficient_log 2_denom bits. If coefficient_data_type is equal to 1, the length of the tpb_coef[y][x][cmp][i][j][k] syntax element is 32 bits. The values of the weighting coefficients or the gain coefficient in the normalization associated with mapping_idc[y][x][cmp] is derived as follows:

If coefficient_data_type is equal to 0, the value of the weighting coefficients or the gain coefficient is equal to fp_tpb_coef[y][x][cmp][i][j][k]=(tpb_int [y][x][cmp][i][j][k]<<coefficient_log 2_denom)+tpb_coef [y][x][cmp][i][j][k], where "<<" represents shift operation.

If coefficient_data_type is equal to 1, the values of the weighting coefficients or the gain coefficient is equal to tpb_coef[y][x][cmp][i][j][k].

Example Process Flows

Figure 4A:
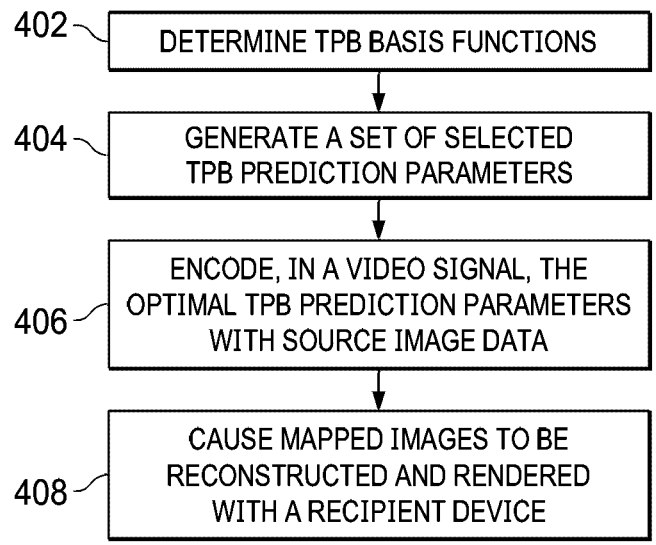
FIG. 4A and FIG. 4B illustrate example process flows.

FIG. 4A illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 402, an image processing system determines a set of tensor-product B-Spline (TPB) basis functions.

In block 404, the image processing system generates a set of selected TPB prediction parameters to be used with the set of TPB basis functions for generating predicted image data in one or more mapped images from source image data in one or more source images of a source color grade. The set of selected TPB prediction parameters is generated by minimizing differences between the predicted image data in the one or more mapped images and reference image data in one or more reference images of a reference color grade. The one or more reference images correspond to the one or more source images and depict same visual content as depicted by the one or more source images.

In block 406, the image processing system encodes, in a video signal, the set of selected TPB prediction parameters as a part of image metadata along with the source image data in the one or more source images.

In block 408, the image processing system causes the one or more mapped images to be reconstructed and rendered with a recipient device of the video signal.

In an embodiment, at least one of the source image data or the reference image data is represented in a subsampling format of a color space.

In an embodiment, the one or more source images represent one of: images constituting a visual scene in a media program, images selected within a sliding window, images selected within a linear segment, etc.

In an embodiment, the set of TPB basis functions are generated by tensor products of one or more sets of B-Spline basis functions; each set of B-Spline basis functions in the one or more sets of B-Spline basis functions corresponds to a respective color channel in one or more color channels of a color space.

In an embodiment, at least one set of B-Spline basis functions in the one or more sets of B-Spline basis functions represents a complete of B-Spline basis functions of a specific order.

In an embodiment, the one or more sets of B-Spline basis functions comprises a set of B-Spline basis function generated with truncated polynomials and a set of uniformly distributed knot points.

In an embodiment, a combination of the set of selected TPB prediction parameters and the set of TPB basis function represents a cross-channel predictor for generating the predicted image data in the one or more mapped images.

In an embodiment, the set of TPB prediction parameters are generated using a plurality of mapping pairs each of which comprises a first array of one or more source codewords generated from the source image data and a second array of one or more reference codewords generated from the reference image data.

In an embodiment, the plurality of mapping pairs is generated based on a three-dimensional mapping table (3DMT).

Figure 4B:
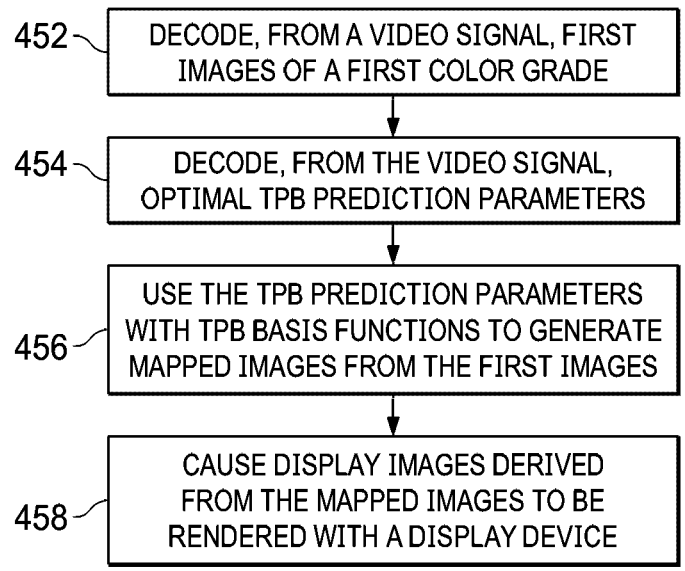

FIG. 4B illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a prediction model and feature selection system, a reverse mapping generation and application system, etc.) may perform this process flow. In block 452, a video decoding system decodes, from a video signal, one or more first images of a first color grade.

In block 454, the video decoding system decodes, from the video signal, image metadata comprising a set of selected TPB prediction parameters for multiplying with a set of tensor-product B-Spline (TPB) basis functions.

The set of selected TPB prediction parameters was generated by an upstream video content processor, wherein the set of selected TPB prediction parameters is to be used with the set of TPB basis functions for generating predicted image data in one or more mapped images from first image data in one or more first images of a first color grade. The upstream video content processor generated the set of selected TPB prediction parameters by minimizing differences between the predicted image data in the one or more mapped images and reference image data in one or more reference images of a reference color grade. The one or more reference images correspond to the one or more first images and depict same visual content as depicted by the one or more first images.

In block 456, the video decoding system uses the set of TPB prediction parameters with the set of TPB basis functions to generate the one or more mapped images from the one or more first images.

In block 458, the video decoding system causes one or more display images derived from the one or more mapped images to be rendered with a display device.

In an embodiment, the video decoding system is further configured to perform: generating a plurality of B-Spline basis function output values; applying cross product operations to the plurality of B-Spline basis function output values to generate a plurality of TPB basis function output values, thereby generating a set of pluralities of TPB basis function output values; multiplying the set of TPB prediction parameters decoded from the video signal with the set of pluralities of TPB basis function output values to generate the set of predicted codewords.

In an embodiment, the set of selected TPB prediction parameters is encoded as a plurality of weight coefficients in a coding syntax that supports carrying a respective weight coefficient, in the plurality of weight coefficients, for a corresponding TPB basis function in the set of TPB basis functions.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
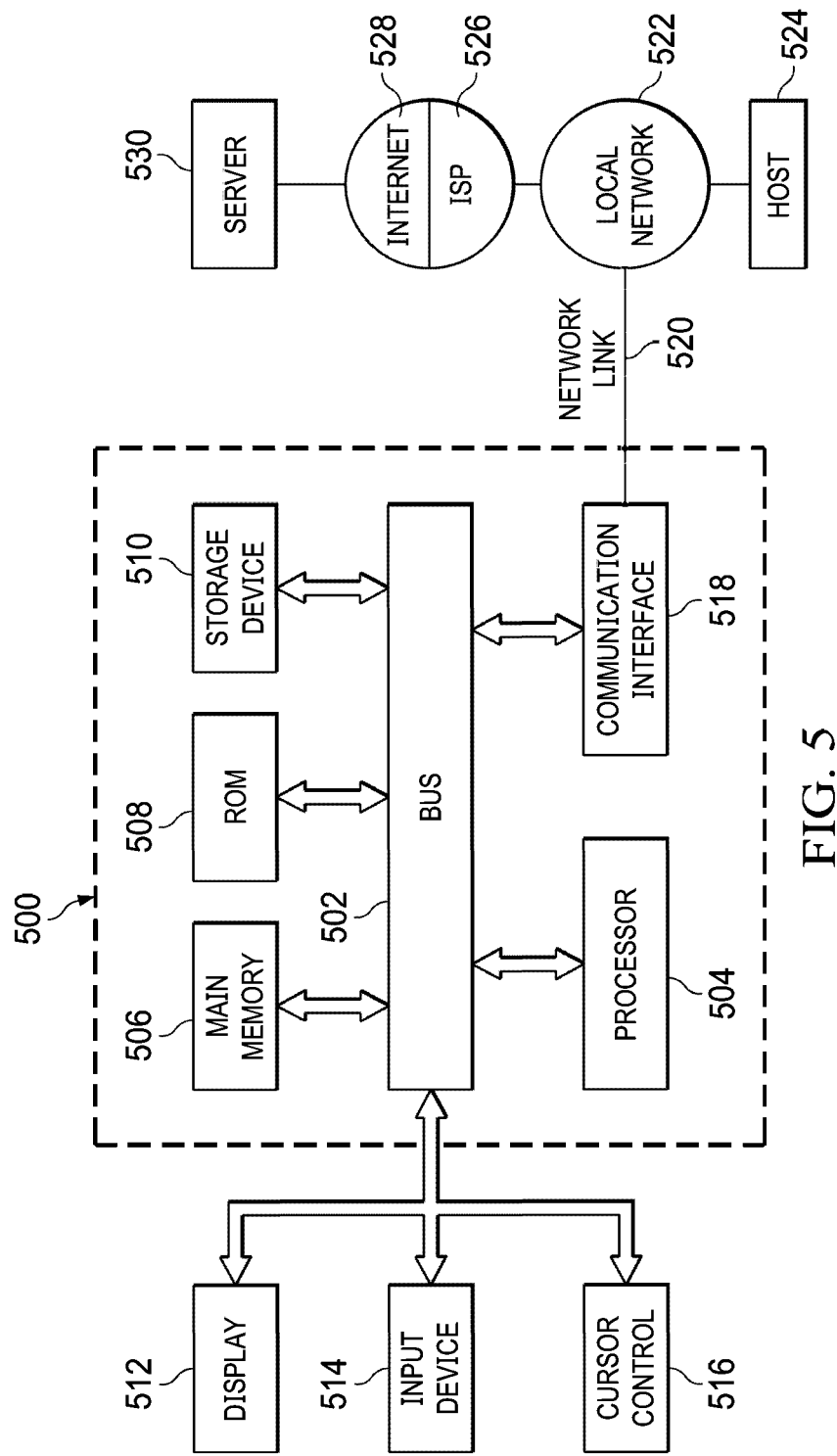
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Exemplary Embodiments

The invention may be embodied in any of the forms described herein, including, but not limited to the following Enumerated Example Embodiments (EEEs) which describe structure, features, and functionality of some portions of embodiments of the present invention.

EEE1. A method comprising:
determining a set of tensor-product B-Spline (TPB) basis functions;
generating a set of selected TPB prediction parameters to be used with the set of TPB basis functions for generating predicted image data in one or more mapped images from source image data in one or more source images of a source color grade, wherein the set of selected TPB prediction parameters is generated by minimizing differences between the predicted image data in the one or more mapped images and reference image data in one or more reference images of a reference color grade, wherein the one or more reference images correspond to the one or more source images and depict the same visual content as depicted by the one or more source images;

encoding, in a video signal, the set of selected TPB prediction parameters as a part of image metadata along with the source image data in the one or more source images;

causing the one or more mapped images to be reconstructed and rendered with a recipient device of the video signal.

EEE2. The method of EEE1, wherein at least one of the source image data or the reference image data is represented in a subsampling format of a color space.

EEE3. The method of EEE1 or 2, wherein the one or more source images represent one of: images constituting a visual scene in a media program, images selected within a sliding window, or images selected within a linear segment.

EEE4. The method of any of EEE1-3, wherein the set of TPB basis functions are generated by tensor products of one or more sets of B-Spline basis functions, and wherein each set of B-Spline basis functions in the one or more sets of B-Spline basis functions corresponds to a respective color channel in one or more color channels of a color space.

EEE5. The method of EEE4, wherein at least one set of B-Spline basis functions in the one or more sets of B-Spline basis functions represents a complete set of B-Spline basis functions of a specific order.

EEE6. The method of EEE4 or 5, wherein the one or more sets of B-Spline basis functions comprises a set of B-Spline basis function generated with truncated polynomials and a set of uniformly distributed knot points.

EEE7. The method of any of EEE1-6, wherein a combination of the set of selected TPB prediction parameters and the set of TPB basis function represents a cross-channel predictor for generating the predicted image data in the one or more mapped images.

EEE8. The method of any of EEE1-7, wherein the set of TPB prediction parameters are generated using a plurality of mapping pairs each of which comprises a first array of one or more source codewords generated from the source image data and a second array of one or more reference codewords generated from the reference image data.

EEE9. The method of EEE8, wherein the plurality of mapping pairs is generated based on a three-dimensional mapping table (3DMT).

EEE10. A method comprising:
decoding, from a video signal, one or more first images of a first color grade;
decoding, from the video signal, image metadata comprising a set of selected TPB prediction parameters for multiplying with a set of tensor-product B-Spline (TPB) basis functions;
using the set of TPB prediction parameters with the set of TPB basis functions to generate the one or more mapped images from the one or more first images;
causing one or more display images derived from the one or more mapped images to be rendered with a display device.

EEE11. The method of EEE10, wherein the set of selected TPB prediction parameters was generated by an upstream video content processor, wherein the set of selected TPB prediction parameters is to be used with the set of TPB basis functions for generating predicted image data in one or more mapped images from first image data in one or more first images of a first color grade, wherein the upstream video content processor generated the set of selected TPB prediction parameters by minimizing differences between the predicted image data in the one or more mapped images and reference image data in one or more reference images of a reference color grade, wherein the one or more reference images correspond to the one or more first images and depict the same visual content as depicted by the one or more first images.

EEE12. The method of EEE10, further comprising:
generating a plurality of B-Spline basis function output values;
applying cross product operations to the plurality of B-Spline basis function output values to generate a plurality of TPB basis function output values, thereby generating a set of pluralities of TPB basis function output values;
multiplying the set of TPB prediction parameters decoded from the video signal with the set of pluralities of TPB basis function output values to generate the set of predicted codewords.

EEE13. The method of EEE 12, where generating a plurality of B-Spline basis function output values comprises:
for each B-Spline basis function in a plurality of B-Spline basis function, determining knot points and corresponding multiplicative factors to be used in a truncated polynomial to represent each such B-Spline basis function;
using a decoded codeword in the one or more first images as input to the truncated polynomial to generate an output value for each such B-Spline basis function.

EEE14. The method of EEE 12, further comprising:
storing the plurality of B-Spline basis function output values in local registers;
for each TPB basis function in the TPB basis functions, identifying (n+1) non-zero B-Spline basis function output values in each channel of a color space, among the plurality of B-Spline basis function output values, wherein n indicates an order of the plurality of B-Spline basis function;
using the (n+1) non-zero B-Spline basis function output values as part of input to generate an output value for each such TPB basis function from a decoded codeword in the one or more first images.

EEE15. The method of EEE12, further comprising:
for each decoded codeword in the one or more first images, generating an output codeword in the one or more mapped images by performing:
initiating the output codeword to zero;
for each TPB basis function in the TPB basis functions, performing:
generating (n+1) non-zero B-Spline basis function output values for each channel in three channels of a color space, thereby generating three sets of (n+1) non-zero B-Spline basis function output values, wherein n indicates an order of the plurality of B-Spline basis function;
applying cross product operations to three sets of (n+1) non-zero B-Spline basis function output values to generate a TPB basis function output value from the decoded codeword in the one or more first images;
generating a product by multiplying the TPB basis function output value with a corresponding prediction parameter in the set of TPB prediction parameters;
adding the product to the output codeword.

EEE16. The method of any of EEE10-15, wherein the set of selected TPB prediction parameters is encoded as a plurality of weight coefficients in a coding syntax that supports carrying a respective weight coefficient, in the plurality of weight coefficients, for a corresponding TPB basis function in the set of TPB basis functions.

EEE17. A computer system configured to perform any one of the methods recited in EEE1-EEE16.

EEE18. An apparatus comprising a processor and configured to perform any one of the methods recited in EEE1-EEE16.

EEE19. A non-transitory computer-readable storage medium having stored thereon computer-executable instruction for executing a method in accordance with any of the methods recited in EEE1-EEE16.

The invention claimed is:

1. A method comprising:
generating a set of prediction parameters for generating, from source image data in one or more source images of a source color grade, predicted image data of at least one color channel of one or more mapped images, wherein the one or more mapped images comprise M color channels, with M>1,
wherein generating the set of prediction parameters for said at least one color channel comprises:
determining a set of tensor-product B-Spline (TPB) basis functions, corresponding to a tensor product of M sets of B-spline basis functions;
generating, as the set of prediction parameters for said at least one color channel, a set of selected TPB prediction parameters to be used with the set of TPB basis functions for generating predicted image data of said at least one color channel of said one or more mapped images from said source image data in said one or more source images of said source color grade, wherein the set of selected TPB prediction parameters is generated by minimizing differences between the predicted image data of said at least one color channel of the one or more mapped images and reference image data in one or more reference images of a reference color grade, wherein the one or more reference images correspond to the one or more source images and depict the same visual content as depicted by the one or more source images;
encoding, in a video signal, the set of selected TPB prediction parameters as a part of image metadata along with the source image data in the one or more source images for enabling reconstructing and rendering of the one or more mapped images with a recipient device of the video signal.

2. The method of claim 1, wherein determining the set of TPB basis functions comprises:
determining a set of B-spline basis functions for each of the M color channels; and
determining the set of TPB basis functions as a tensor product of each of the sets of B-Spline basis functions.

3. The method of claim 1, wherein at least one of the source image data or the reference image data is represented in a subsampling format of a color space.

4. The method of claim 1, wherein the one or more source images represent one of: images constituting a visual scene in a media program, images selected within a sliding window, or images selected within a linear segment.

5. The method of claim 1, wherein at least one of said sets of B-Spline basis functions represents a complete set of B-Spline basis functions of a specific order.

6. The method of claim 1, wherein each of the sets of B-Spline basis functions is generated using a set of uniformly distributed knot points.

7. The method of claim 1, wherein each of the sets of B-spline basis functions are generated with truncated polynomials.

8. The method of claim 1, a set of selected TPB prediction parameters is generated for each of the multiple color channels, wherein the sets of selected TPB prediction parameters of at least two color channels are generated using the same set of TPB basis functions.

9. The method of claim 1, wherein a combination of the set of selected TPB prediction parameters and the set of TPB basis function represents a cross-channel predictor for generating the predicted image data in the one or more mapped images.

10. The method of claim 1, wherein the set of TPB prediction parameters are generated using a plurality of mapping pairs each of which comprises a first array of one or more source codewords generated from the source image data and a second array of one or more reference codewords generated from the reference image data.

11. The method of claim 10, wherein the plurality of mapping pairs is generated based on a three-dimensional mapping table (3DMT).

12. The method of claim 10, wherein the source codewords of pixels of the source image are partitioned into a fixed number of bins, and for each bin, an average of reference codewords of pixels of the reference image corresponding to the pixels of the source image in the respective bin is calculated, and the first array comprises center values of the source codeword bins and the second array comprises the corresponding calculated average of the reference codeword values.

13. A method comprising:
decoding, from a video signal, one or more first images of a first color grade and comprising M color channels, with M>1;
accessing a set of tensor-product B-Spline (TPB) basis functions corresponding to a tensor product of M sets of B-spline basis functions;
decoding, from the video signal, image metadata comprising a set of selected TPB prediction parameters for multiplying with the set of tensor-product B-Spline (TPB) basis functions;
using the set of TPB prediction parameters with the set of TPB basis functions to generate one or more mapped images from the one or more first images; and
causing one or more display images derived from the one or more mapped images to be rendered with a display device.

14. The method of claim 13, further comprising:
generating a plurality of B-Spline basis function output values;
applying cross product operations to the plurality of B-Spline basis function output values to generate a plurality of TPB basis function output values, thereby generating a set of pluralities of TPB basis function output values;
multiplying the set of TPB prediction parameters decoded from the video signal with the set of pluralities of TPB basis function output values to generate the set of predicted codewords.

15. The method of claim 14, where generating a plurality of B-Spline basis function output values comprises:
for each B-Spline basis function in a plurality of B-Spline basis function, determining knot points and corresponding multiplicative factors to be used in a truncated polynomial to represent each such B-Spline basis function;

using a decoded codeword in the one or more first images as input to the truncated polynomial to generate an output value for each such B-Spline basis function.

16. The method of claim 14, further comprising:

storing the plurality of B-Spline basis function output values in local registers;

for each TPB basis function in the TPB basis functions, identifying (n+1) non-zero B-Spline basis function output values in each channel of a color space, among the plurality of B-Spline basis function output values, wherein n indicates an order of the plurality of B-Spline basis function;

using the (n+1) non-zero B-Spline basis function output values as part of input to generate an output value for each such TPB basis function from a decoded codeword in the one or more first images.

17. The method of claim 14, further comprising:

for each decoded codeword in the one or more first images, generating an output codeword in the one or more mapped images by performing:

initiating the output codeword to zero;

for each TPB basis function in the TPB basis functions, performing:

generating (n+1) non-zero B-Spline basis function output values for each channel in three channels of a color space, thereby generating three sets of (n+1) non-zero B-Spline basis function output values, wherein n indicates an order of the plurality of B-Spline basis function;

applying cross product operations to three sets of (n+1) non-zero B-Spline basis function output values to generate a TPB basis function output value from the decoded codeword in the one or more first images;

generating a product by multiplying the TPB basis function output value with a corresponding prediction parameter in the set of TPB prediction parameters;

adding the product to the output codeword.

18. The method of claim 13, wherein the set of selected TPB prediction parameters is encoded as a plurality of weight coefficients in a coding syntax that supports carrying a respective weight coefficient, in the plurality of weight coefficients, for a corresponding TPB basis function in the set of TPB basis functions.

19. An apparatus comprising a processor and configured to perform the method recited in claim 1.

20. A non-transitory computer-readable storage medium having stored thereon computer-executable instruction for executing a method in accordance with the method recited in claim 1.

* * * * *